Aug. 14, 1962 G. DIRKS 3,049,694

STORAGE DEVICES FOR SIGNALS

Filed Oct. 23, 1956 16 Sheets-Sheet 1

Inventor
Gerhard Dirks

By Shoemaker & Mattare
Attys

Inventor
Gerhard Dirks
By Shoemaker & Mattare
Attys

Inventor
Gerhard Dirks
By Shoemaker & Mattare
Attys

Inventor
Gerhard Dirks
By Shoemaker & Mattare
Attys

Inventor
Gerhard Dirks
By Shoemaker & Mattare
Attys

Aug. 14, 1962 G. DIRKS 3,049,694

STORAGE DEVICES FOR SIGNALS

Filed Oct. 23, 1956 16 Sheets-Sheet 6

Inventor
Gerhard Dirks

By Shoemaker & Mattare
Attys

Aug. 14, 1962 G. DIRKS 3,049,694

STORAGE DEVICES FOR SIGNALS

Filed Oct. 23, 1956 16 Sheets-Sheet 7

Inventor
Gerhard Dirks
By Shoemaker & Mattare
Attys

Aug. 14, 1962 G. DIRKS 3,049,694

STORAGE DEVICES FOR SIGNALS

Filed Oct. 23, 1956 16 Sheets-Sheet 8

Inventor
Gerhard Dirks

By Shoemaker & Mattare
Attys

Inventor
Gerhard Dirks
By Shoemaker & Mattare
Attys

Inventor
Gerhard Dirks
By Shoemaker & Mattare
Attys

Inventor
Gerhard Dirks
By Shoemaker & Mattare
Attys

Inventor
Gerhard Dirks
By Shoemaker & Mattare
Attys

Inventor
Gerhard Dirks
By Shoemaker & Mattare
Attys

Inventor
Gerhard Dirks
By Shoemaker & Mattare
Attys

Inventor
Gerhard Dirks
By Shoemaker & Mattare
Attys

Aug. 14, 1962 G. DIRKS 3,049,694

STORAGE DEVICES FOR SIGNALS

Filed Oct. 23, 1956 16 Sheets-Sheet 16

Inventor
Gerhard Dirks

By Shoemaker & Mattare
Attys

United States Patent Office 3,049,694

Patented Aug. 14, 1962

3,049,694

STORAGE DEVICES FOR SIGNALS

Gerhard Dirks, 44 Morfelder Landstrasse, Frankfurt am Main, Germany

Filed Oct. 23, 1956, Ser. No. 617,742
Claims priority, application Great Britain Oct. 25, 1955
18 Claims. (Cl. 340—172.5)

The present invention relates to cyclic storage means for signals with selective sensing means and has for its main object to provide a much increased storage capacity within a given space volume.

It is a great disadvantage of the hitherto known cyclic storages of the magnetic drum type that within a given space volume their storage capacity is limited by their requiring the space of the non-operative interior of the drum, especially as their diameters may, in the known arrangements, range up from eight and ten inches to twenty inches or more. It is a further disadvantage that these drums must be manufactured with great precision especially as to the concentricity of the storage surface.

These disadvantages are especially important in office machines having drum storages, which require within a relatively small cubic space a storage capacity of from one to ten million characters, which can be made at a relatively low cost and, if possible which are grouped in units in various multiples selectively at will. In such machines the requirements as to access time for sensing and recording may in general, be no higher than 0.5 to 0.02 second.

It is therefore one object of the present invention to provide a selective storage means for signals comprising a plurality of rotary storage elements (main storage elements) mounted in a frame, selective sensing and recording means for the main storage elements, and at least one additional storage element common to a plurality of main storage elements, also with selective sensing and recording means, with signal transfer means operating selectively between said first-named sensing and recording means and the second-named sensing and recording means whereby such additional storage element may be used as an intermediate storage between input or output means and any of said first-named storage elements. The said additional storage may also be of a rotary type, and may rotate at a higher speed than the main storages.

It is a further object of the invention to provide such an arrangement wherein the selective sensing and recording means makes its selections with a plurality of said first-named storage elements simultaneously, such selections being effective or ineffective in dependence on said signal transfer means.

It is another object of the invention to provide a selective storage arrangement for signals in which signal heads are used which may be pressed against the storage layer or surface selectively, preferably under the control of a magnet or magnets, or magnet and spring in order to avoid the necessity for close precision as to the concentricity of the drum or the like and exact positioning of signal heads relatively to the storage surface.

In an alternative to this arrangement rollers or other means are coordinated to the signal heads and roll or glide on the drum or like surface to ensure the best sensing and recording conditions, e.g. with a constant air gap, or constant surface contact independently of an eccentricity of the drum.

Shifting means may be provided for an axial shifting of signal heads relatively to the drum or the like for selection of storage positions, and in any arrangement a timed selection means may be used for a selective transfer of information to or from an intermediate storage, preferably with one of the storages (drums or the like) operating at speeds which are multiples of the speed of the other storages.

It is another object of the invention to provide a selective storage means for signals comprising a plurality of rotary storage elements (main storage elements) in a frame, selective sensing and recording means for the main storage elements, wherein the selective sensing and recording means move a signal-head over a plurality of tracks and have a common selection-driving means for a plurality of rotary storage elements.

The drums are conveniently assembled together in sets or groups of ten to a hundred drums, and these may be exchangeably mounted in a suitable frame for exchange singly or in groups. The drums may be built up as units of ten and be exchangeably mounted in a set or assembly in rows or other ordered arrangement.

These sets or an assembly of such sets may be held in frames which may form part of bookkeeping or other calculating machines, or of printing and indicating mechanisms.

It is still a further object of the invention to provide a time-selection means controlling the sensing and recording, which includes multi-stage tubes pulse-wise operated in dependence on the movement of the drum or the like.

In accordance with another feature of the invention, one or more series of parallel signal tracks may be provided on the storage means, according to a five, six or seven element code, to contain signals for characters and for control purposes. One drum may comprise from 50 up to 200 such series of tracks, for instance one hundred series, and each such series may have a capacity of signals for 60 to 120 characters.

In use, for example with a bookkeeping machine, the rotation speed may range up to 50 revolutions per second, preferably from 1 to 25 revolutions per second.

Amplification means may be provided preferably within each unit or set of drums or the like, or there may be a common selective amplification storage and control means for the assembly.

There may be common driving means for a continuous and/or stepwise operation of said drums, and in the latter case several drums or the like may be driven by a single synchronous motor.

A further object of the invention is to provide a selective storage means for combination signals comprising a rotary storage element and signal heads traversing signal tracks thereon, wherein there are as many signal heads as there are code elements in the combination being used, mounted in spaced relationship for simultaneous movement across their respective tracks, whereby for each code element of the combination all the channels for that element in a plurality of columns or denominations are grouped together for traverse by the same signal head.

According to a further feature of the invention, the material of the drum or the like is plastic and the record material for storing signals is compounded with such plastic material. The record material may be mixed into the plastic material of the drum or the like, and such material may be of a hard reinforced type, e.g. with woven or other reinforcements.

Finally, the material of the drum or the like is of a non-magnetic metal basis into which magnetic particle material has been incorporated as by melting in.

The above-mentioned features for dealing with possible eccentricity of the drum, and the nature of the materials used for the drum may be adopted for magnetic drums generally, not necessarily in the sizes and arrangement constituting the main feature of the invention as set out above.

Yet another object of the invention is to provide an alternative mode of eliminating the first-named disadvantage, wherein a plurality of concentric drums are arranged one within another, each with independent driving means and with sensing, recording and erasing means. In any case, a drum, or one or more drums in an assembly, may have a storage surface both on the inner and outer faces of a hollow shell, each with its own sensing, recording and erasing heads.

One of the advantages of this improved storage application, is the smaller peripheral speed of the storage surfaces, as well as the very much improved access time.

By way of contrast, it is pointed out that a drum having a diameter of 10 inches would store about 3000 bits as part of binary coded decimal digits in four circumferential parallel tracks, namely four tracks for the four components of the combination signals 1, 2, 4 and 8, equivalent to 3000 decimal digit values, if 100 bits are recorded within one inch of a track as it is now standard practice for drums having an air-gap between signal head and magnetic layer.

Within the same cubic space however, ten rows of ten drums each, that is one hundred drums, each of 1 inch diameter, could be arranged. Taking into account the intermediate space required for sensing and recording means, one could say, for example, that at least 81 useful drums could be arranged in the said space. The length of one storing track regarded as extending over all such drums would be 8.1 times greater than one track on the original ten inch drums.

On one track of a drum of 1 inch diameter, there may be stored say three hundred bits if 100 bits are recorded again within one inch of a track and, on 81 such drums therefore, about 25,000 such bits could be stored in each composite track as against the three thousand on the single track of the larger drum, in the same cubic space.

The holding of the signal head against the storage layer under tension of the spring or the like according to this invention furthermore allows the recording of a maximum of 1000 bits per inch, as the spread extent of a magnetic field occurring with a signal head having an air-gap between it and the magnetic layer is avoided. A track of a drum of 1" diameter may hold therefore about 3000 bits.

In a frame for a bookkeeping machine, for example, such frame being one yard high, 25 inches wide and 15 inches deep, it would be possible to mount up to 500 storage drums each of 1 inch diameter and each drum may include within an axial length of 25 inches, from 500 to 1000 individual tracks, corresponding to 100 or 200 combined tracks for a five element or six element code combination for numerical or alphabetic characters, each combined track being able to store signals for 100 characters. One drum may hold, therefore, signals for 300,000 characters, so that the total storage capacity in such a small frame may range up to 300,000 characters multiplied by 500 drums, which will represent 150,000,000 characters with an access time for selective sensing of less than one second.

In a smaller frame with, for example, 100 drums of 1 inch diameter, 30,000,000 characters could be stored, requiring a space only 12 inches high, 12 inches deep and 25 inches long, and with only 10 drums, about 3,000,000 characters can be stored in a very reasonable cubic space. In practice, the number of bits stored per inch may be less than the said maximum, for example, 400 to 500 per inch.

The storage drums may of course be of a suitable diameter and length.

In order that the present invention may be readily carried into effect, it will now be described with reference to the accompanying drawings, wherein:

FIGS. 1*a–c* show the mechanical structure of an embodiment of the large capacity storage with a plurality of magnetizable drums in a supporting frame; and in which FIG. 1*a* is a front view, FIG. 1*b* is a side view, FIG. 1*c* is a section view taken on line B—B of FIG. 1*a*;

FIGS. 2*a–b* show the structure of an embodiment of the signal head-holders; in which FIG. 2*a* is a front view and FIG. 2*b* is a plan view;

FIGS. 3*a–d* are embodiments of a selectively controllable driving means for shifting signal heads;

FIGS. 4*a–c* show embodiments of the selection control circuits in schematic form for the large capacity storage to select required areas of the storage for reading and recording;

FIGS. 5*a–g* show detailed circuits of circuit elements shown in block form in FIGS. 4*a–c*;

Figure 8A:
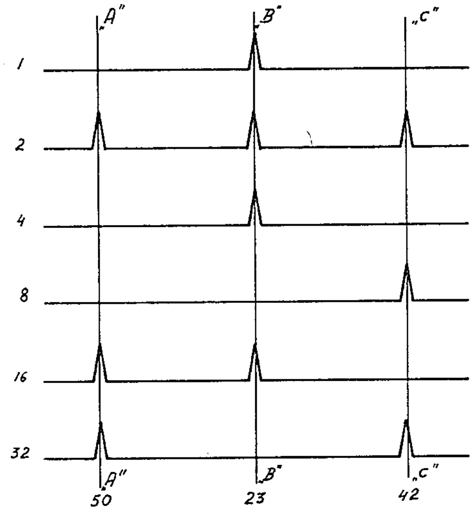
Figure 8B:
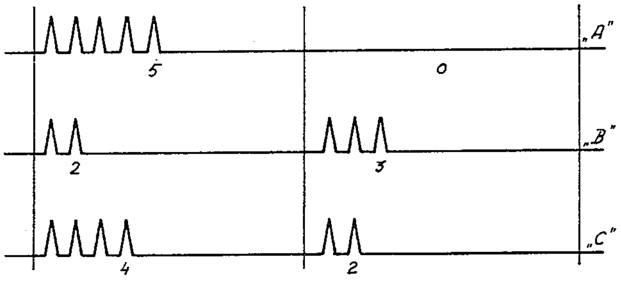
Figure 8C:
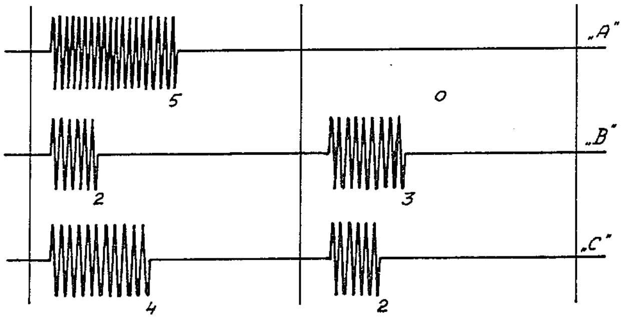
Figure 9:
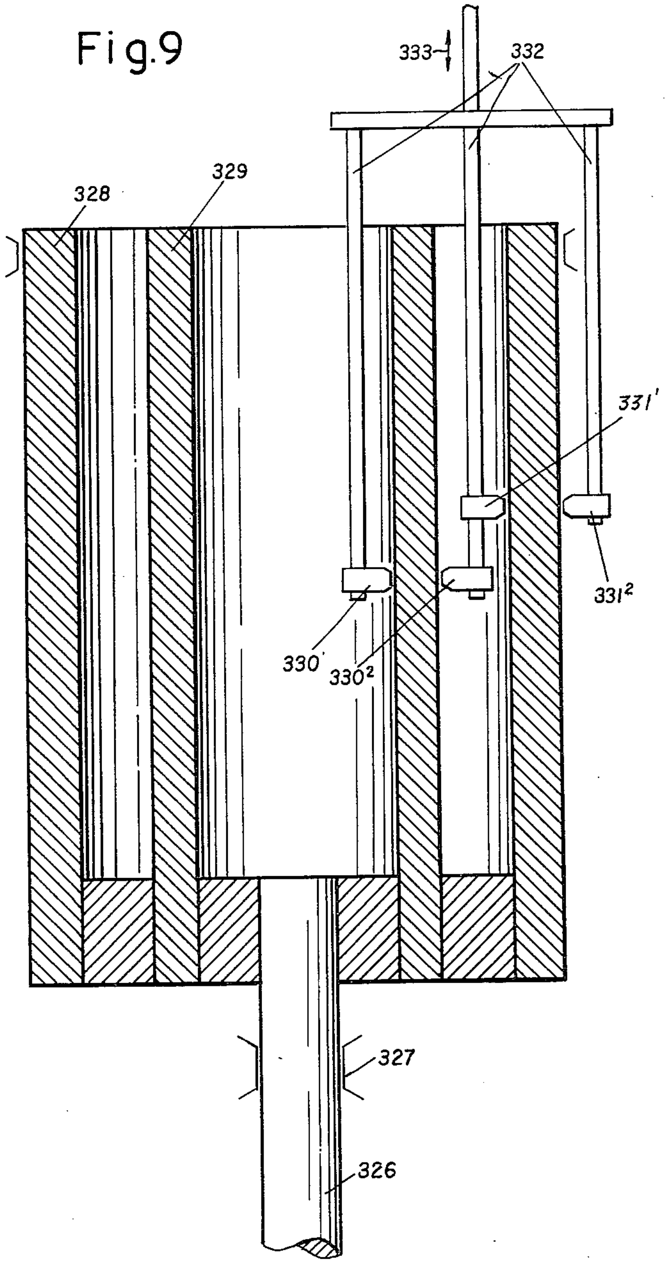

FIGS. 8*a–c* show various forms of signals used for the recording within the large capacity storage; and FIG. 9 shows an alternative structural form of the large capacity storage.

Figure 1A:
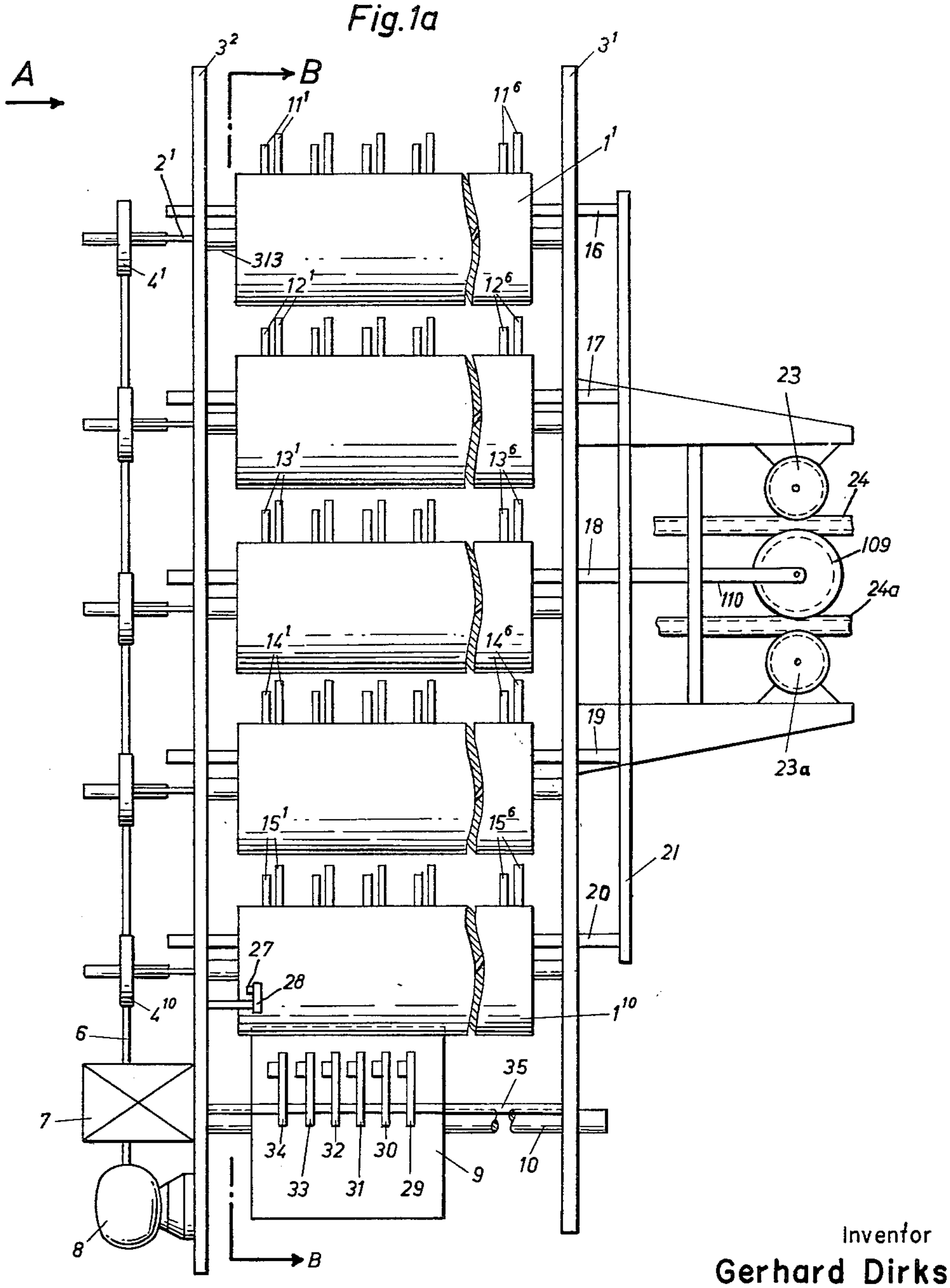
Figure 1C:
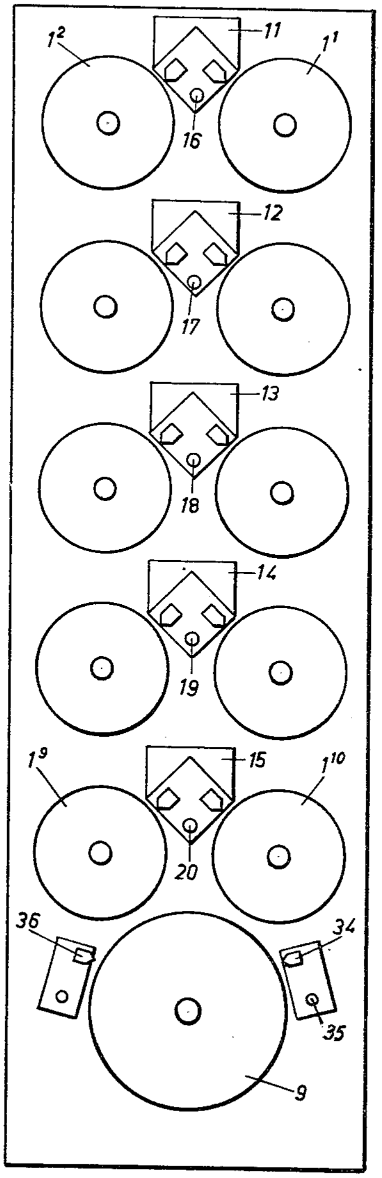
Figure 1B:
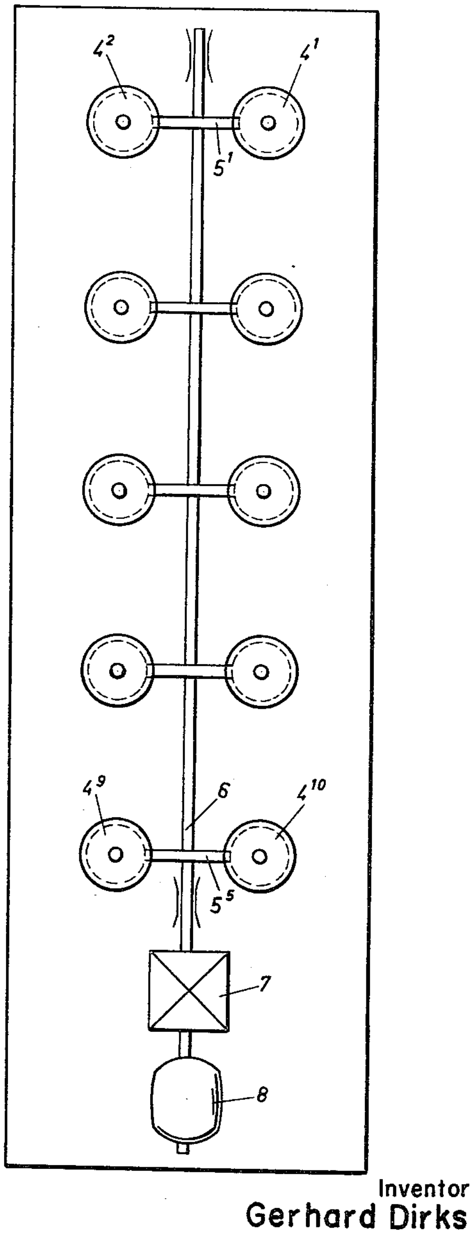

Referring now to FIGS. 1*a–c*, FIG. 1*a* shows a front view of the large capacity storage arrangement whereas the FIGS. 1*b* and 1*c* show side views. As shown by arrows in FIG. 1*a*, FIG. 1*b* shows an exterior side view, whereas FIG. 1*c* shows a cross section along line B.

The storage drums $1^{1-10}$ are each mounted on corresponding shafts $2^{1-10}$ rotatably held within the supporting frame including parts $3^{1-2}$. The storage drums are driven by the gears $4^{1-10}$, which are in mesh with the driving gears $5^{1-5}$. The driving gears $5^{1-5}$ are mounted on a common shaft 6 which is driven through gear assembly 7 by motor 8. The storage drum 9 constitutes an intermediate storage between input for effecting signal transfer to and from the storage drums $1^{1-10}$.

The intermediate storage drum 9 is mounted on shaft 10 which is rotatably supported between the frame parts $3^{1-2}$ and driven by gear assembly 7. The gear assembly 7 drives the storage drums $1^{1-10}$ and the intermediate storage drum 9 at different but proportional speeds which may be of the ratio 1–50; that is the intermediate storage drum 9 rotates at a speed higher by 50 times than the rotational speed of the storage drums $1^{1-10}$ to that groups of words may be recorded in a track of the storage drums $1^{1-10}$ as described later. The rotation speed of the intermediate storage drum may be, e.g. 6000 r.p.m., whereas the speed of the storage drums themselves may be 120 r.p.m. Recording and sensing of these words on the tracks of the storage drums $1^{1-10}$ is effected by recording through signal heads cooperating with the surfaces of storage drums $1^{1-10}$, which heads are mounted on the corresponding signal head-holders $11^{1-6}$, $12^{1-6}$, $13^{1-6}$, $14^{1-6}$ and $15^{1-6}$. These signal head-holders and their supporting frame are shown in more detail in FIGURES 2*a* and 2*b*.

In order to select any wanted track on the storage drums $1^{1-10}$ for sensing or recording the signal head-holders $11^{1-6}$ to $15^{1-6}$ are shifted parallel to the axis of their adjacent storage drum. The shifting is effected by an intermittent drive to driving pinions 23 and **23*a* for axially moving racks 24 and 24*a*. A differential pinion 109 between racks 24 and 24*a* is fixedly secured to link 110 which is in turn attached to a bar 21 carrying supporting rods 16, 17, 18, 19 and 20. The supporting rods 16–20 therefore move together to hold the signal head-holders $11^{1-6}$ to $15^{1-6}$** in desired position.

The selective differential driving means for the holding rods 16–20 is shown and described in more detail in FIGS. 3*a–d* and infra.

FIGURE 1*a* shows furthermore the sensing head 27 which senses zero position indicating signals from storage drum $1^{10}$. This sensing head 27 is secured to angle bracket 28 attached to frame part $3^2$. The signal heads 29, 30, 31, 32, 33 and 34 are mounted on the supporting arm 35 attached between the frame parts $3^1$ and $3^2$, and are spaced by an air gap when they are used for the sensing or recording of signals on intermediate storage drum 9. During sensing, the signals sensed on the intermediate storage drum 9 are transferred by circuitry described later and recorded on storage drums 1$^{1-10}$. The permanent zero indicating signals may be generated by the head 27 sensing a thin permanent magnet in a slot in a non-magnetic part of the drum 1$^{10}$ or the head and magnet may be replaced by a photo-electric cell and an optically readable mark on the drum 1$^{10}$.

*General Scheme of Selection*

Signals are recorded on the rotatable drums in circumferential tracks. The tracks may be subdivided into sub-tracks for the respective code elements of combination signals, for example into six sub tracks for a six-element code combination. Each track is divided into a plurality of areas each corresponding to a word of a given number of denominations, and each representing an item of information.

In order to select such an area for the sensing or recording of an item of information therein it is necessary to select (*a*) The storage drum
(*b*) The track on the selected storage drum and
(*c*) A particular area of the selected track In the examples illustrated, the track selector means is operative for a plurality of the drums simultaneously. Furthermore, in the illustrated arrangement the required track is first selected by shifting all the signal heads along the drums while they are out of contact with the latter. Then the required drum is selected and all the signal heads on the selected drum are brought into operative position relatively thereto. Subsequently, the selection of the required area must be made, which is dependent on a selection of a particular time interval in the rotation of the drum as described later. The storage areas in the tracks may be regarded as arranged in groups, each group containing storage areas for a number of words, and each such area containing a number of storage positions corresponding to columns, letter spaces or denominations. For example, in a storage having ten drums, the total storage capacity may be 5,000,000 characters, each indicated by a combination in a six-element code. Each of said ten drums may have 100 tracks, each made up of six sub-tracks. The sub-tracks for each of the tracks are grouped together and there are as many signal heads as there are sub-tracks in a group, one for each, and these heads are on a common mounting for simultaneous movement. The first signal head senses or records signals of the first element of the code and so on and may be shifted over 100 sub-tracks, namely the sub-tracks for the first code element of all the tracks.

Each drum may have a length of 600 mm., accommodating 600 sub-tracks corresponding to 100 tracks each having six sub-tracks, but instead of all the sub-tracks of a track being grouped together, all the sub-tracks for a code element are grouped together so that the signal heads may be mounted at distances from each other equal to the width of 100 sub-tracks.

Figure 2A:
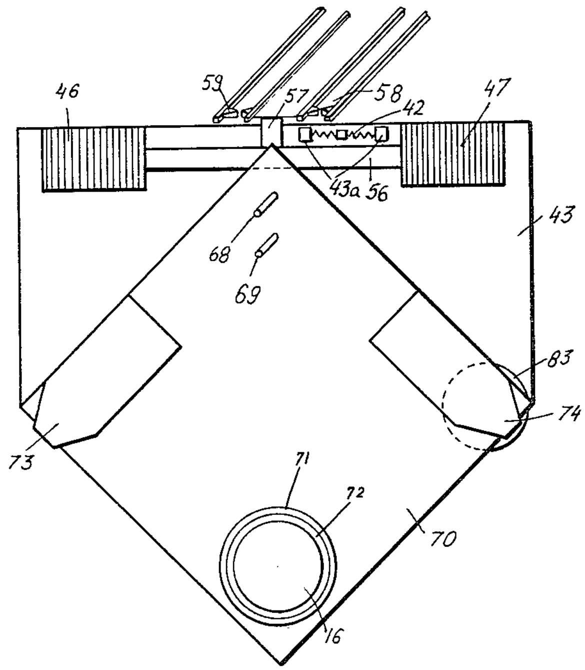

The signal head-holders include the base plate 43, FIGS. 2*a* and *b*, which is fixed to the sleeve 44 and attached by screw 45 to shaft 16. The two magnet coils 46 and 47 are mounted on base plate 43. The magnet coils 46, 47 move the armature consisting of a single rod 56, in dependence on which one of the two coils is energized either to the left or to the right from a central or neutral position. The return of the armature 56 into the central position is effected through spring 42 attached to rod arm 56 and tensioned by movement of the latter by abutting lugs 43*a* on plate 43. By movement of armature 56, depending upon which of coils 46 and 47 is energized, either contact 58 (upon movement to the right) or contact 59 (upon movement to left) is closed. The closing of said contact is effected by the projecting piece of insulating material 57, suitably attached to armature 56.

At the same time both springs 68 and 69 attached to armature 56 move therewith either to the left or to the right. Springs 68, 69 each pass through an opening in the signal head-holder 70. Signal head-holder 70 is rotatably mounted by hub 71 on shaft 16 and is secured by ring 72 seated in a suitable groove on shaft 16, against axial displacement on the shaft. Thus, springs 68, 69 move the signal head-holder either to the right or left and the springs ensure contact for sensing of one or other of the signal heads 73, 75 which are mounted on the signal head-holder 70 with the associated storage drum while avoiding damaging the latter.

Figure 2B:
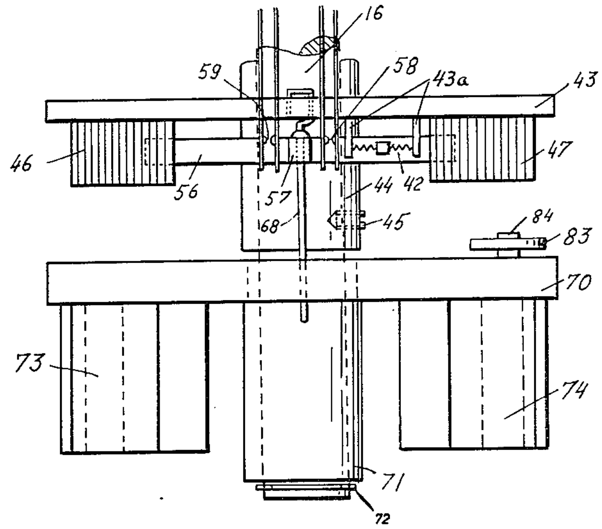

The sensing or recording of the signals by any one of the signal heads 73 or 74 on one of the drums may be effected either by bringing the signal head into contact with the magnetizable surface of the drum or by providing a constant air gap between the signal head and the magnetic layer. If the sensing is effected by bringing the signal head directly into contact with the magnetic layer, the arrangement used is as shown in the left side of the drawings of FIGS. 2*a*, 2*b*. If, on the other hand, there is to be a constant air gap, an arrangement according to the right hand side of the drawings of FIGS. 2*a*, 2*b* is used. The constant air gap is provided by means of a roller 83 which is pivotally mounted by bolt 84 attached to signal head-holder 70 and rolls on the surface of the drum. The diameter of the roller relative to the signal is chosen so that a suitable distance for the sensing and recording is maintained between the signal head which has been moved towards a drum and the surface of the drum.

*Mechanical Means for Track Selection*

Figure 3A:
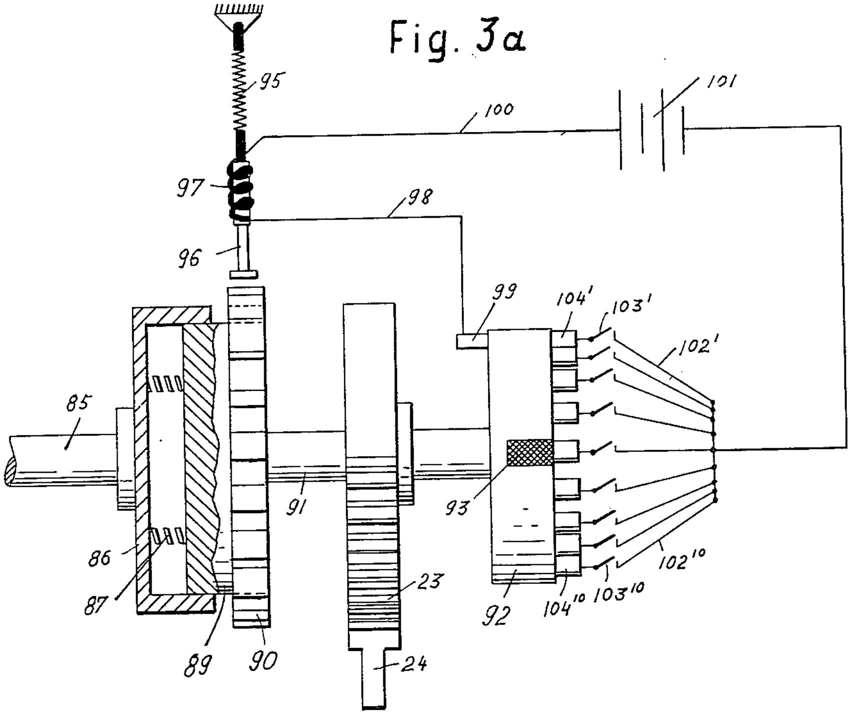
Figure 3B:
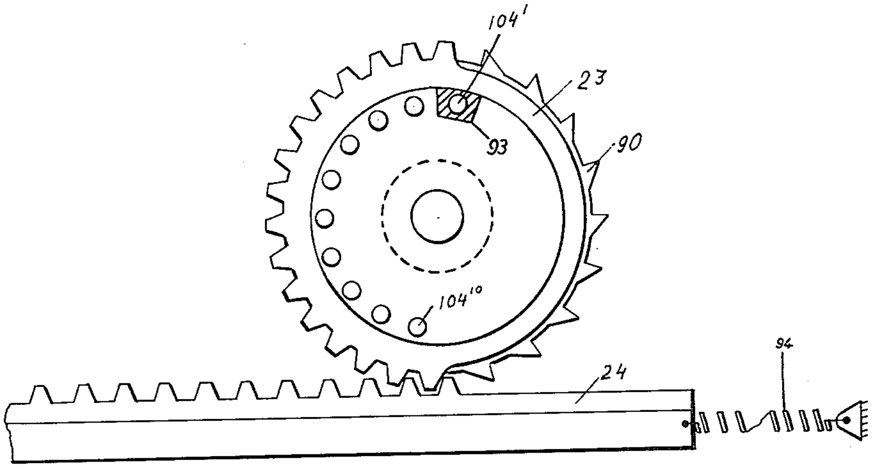

Shifting means for the sensing heads is shown in FIGS. 3*a*, *b* to a single sensing. Friction clutch 86 presses, by means of its springs 87, the friction disc 89 against the locking wheel 90. Friction clutch 86 rotates with shaft 85 which is constantly driven by a motor (not shown). Locking wheel 90 and pinion 23 are mounted on shaft 91. As described, pinion 23 engages rack 24. A metallic disc 92 provided with an insulating piece 93 is also mounted on shaft 91. The rack 24 is returned by spring 94 (FIG. 3*b*) to its starting position after its limit of movement has been reached. Another spring 95 urges a locking member 96 to normally engage locking wheel 90. The electromagnet 97 may be energized by a circuit through line 98, contact brush 99, disc 92, one of ten contact brushes 104$^{1-10}$, a closed contact of the group 103$^{1-10}$, a line of the group 102$^{1-10}$, battery 101 and line 100. The electromagnet 97 is effective when energized to withdraw locking member 96 from locking engagement with wheel 90 against spring 95. The mechanical means for track selection operates as follows:

Shaft 85 with clutch 86 is constantly driven and disc 89 which is provided with a friction layer tends to drive the locking wheel 90 which is mounted on shaft 91. The locking member 96, which is however pressed by spring 95 against locking wheel 90, prevents movement until electromagnet 97 is energized.

When one of the contacts 103$^{1-10}$ is operated by means described later, the source of power 101 is connected with one of the contact brushes 104$^{1-10}$. The current passes through electrically conductive disc 92, contact brush 99, line 98 to the electromagnet 97 and from there back to the source of power. When the circuit is closed, electromagnet 97 is energized and moves the locking member 96 against the action of spring 95, so that the locking wheel 90 will be released. When locking wheel 90 rotates shaft 91 and disc 92 rotate until the insulating piece 93 is opposite to whichever of the contact brushes 104$^{1-10}$ is connected through one of the contacts 103$^{1-10}$ with the source of power 101. (In FIG. 3*b* the insulating piece is shown in its initial position.) As soon as insulating piece 93 is opposite the operative contact brush, the circuit is interrupted and the electromagnet becomes deenergized so that the spring 95 presses the locking member 96 against the locking wheel 90 to arrest the rotation of the latter. During its rotation, the wheel 90 will have rotated pinion 23 to move rack 24 into a predetermined position.

Because the linear displacement of rack 24 is limited, and because pinion 23 is driven in only one direction, the pinion has teeth on only one-half of its circumference. If, during rotation, the portion of the pinion devoid of teeth extends above the rack, spring 94 urges the rack to its starting position. The spring 94, shown as a compression spring, may also be arranged at the other end of the rack and act as a tension spring. Thus, it is understood that when any of the contacts $103^{1-10}$ is operated by means described below the pinion 23 will either drive rack 24 through its teeth in engagement therewith or disengage from rack 23 so that the latter is spring moved to its starting position.

Figure 3C:
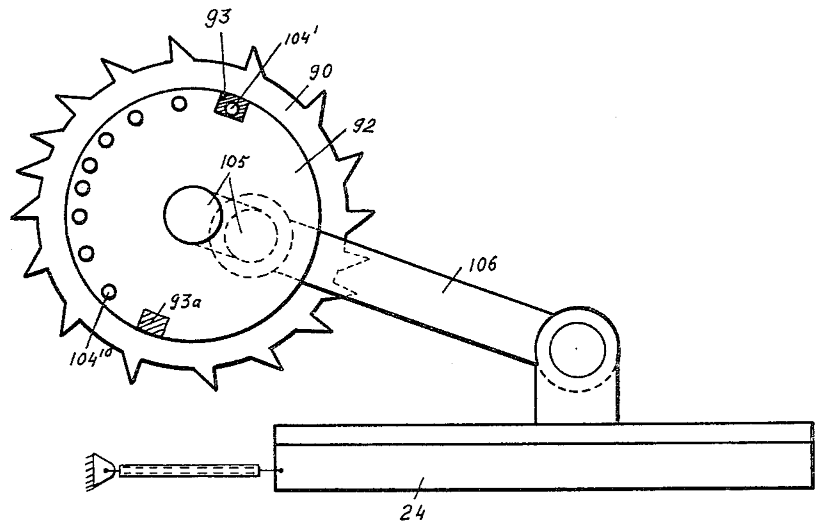

FIGURE 3*c* shows another structure for mechanically shifting the rack 24. Thus, the shaft 91 is provided with a crank arm 105. The movement is no longer effected by pinion 23 engaged with rack 24, but through the connecting rod 106 linked to the rack 24. As the rack 24 must move equal distances, and such movement is impossible if the contact brushes $104^{1-10}$ are equally spaced, as was the case in relation to the teeth of the locking wheel 90, in this design the distance between the contact brushes $104^{1-10}$ is made unequal proportionately to the dimensions of the crank arms. Whereas in the embodiment including a rack and pinion transmission one half rotation of the pinion is lost motion, in the embodiment shown in FIG. 3*c* the controlled movement is obtained by one complete rotation. Therefore, disc 92 includes a second insulating piece 93*a* which interrupts the circuit during the backward movement of the rod.

Figure 3D:
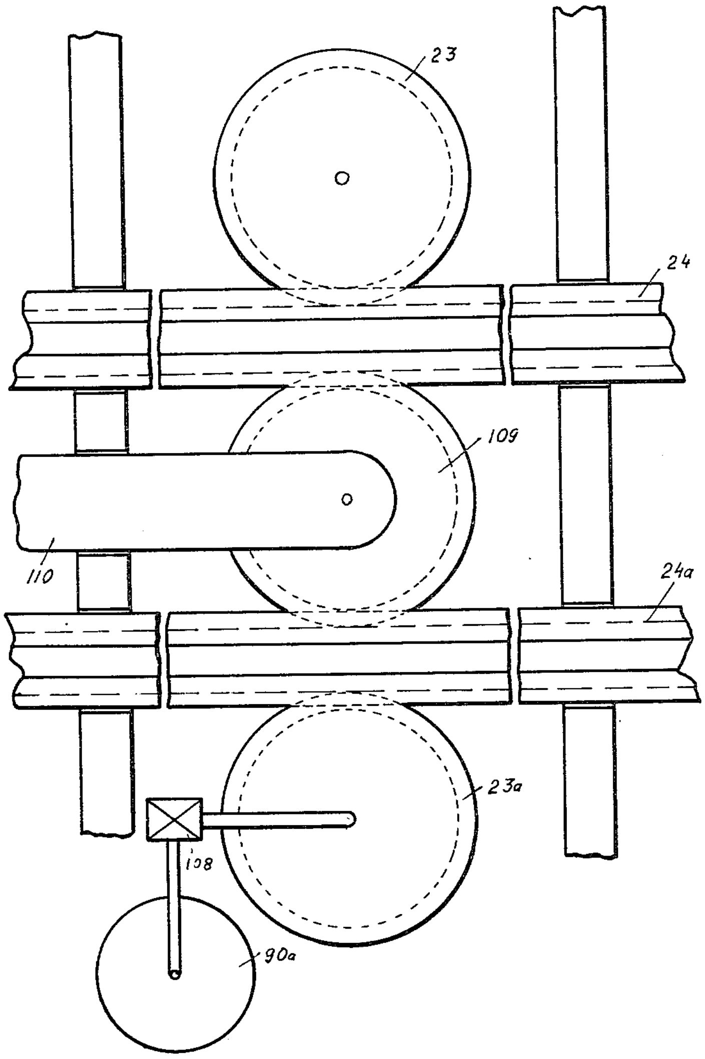

FIG. 3*d* shows an arrangement using two driving means of the kind shown in more detail in FIGS. 3*a* and *b*. Gear 23 is the driving pinion of a first driving unit which can be driven by a motor at any convenient speed. The locking wheel 90*a* drives the driving pinion 23*a* of the second driving unit which is independently controlled, but the wheel 90*a* is driven by the same motor through a gear 108 with a reduction ratio 1:10. The movement of the pinion 109 which is carried by the selecting rod 110 may be effected by means of an axial shifting of rack 24 consequent upon rotation of gear 23 which causes rolling of pinion 109 on rack 24*a*. At the same time, gear 23*a* may be rotated so that the rack 24*a* is also axially shifted and the result is an addition of movement of both racks 24, 24*a*. The effect of both gears 23 and 23*a* may be such that a shifting of the selection rod 110 equal to the distance occupied by ten tracks is effected for rotation of gear 23 through 180° whereas the rotation of gear 23*a* through 180° effects a shifting corresponding to the distance occupied by one recording track.

By the addition of the movement of racks 24, 24*a* cooperating with gears 23 and 23*a* any required positioning of the selecting rod 110 is obtained and the signal heads $73^1$ through $82^6$ (FIG. 4*a*) may be adjusted to any of one hundred possible positions because the total movement of the pinions 23 and 23*a* is each subdivided into ten steps. Thus it can be seen that relatively rapid positioning of the signal heads may be obtained.

The abovementioned division of the tracks into storage areas and storage positions extends through all the sub-tracks. There may be 5000 storage positions in a track, grouped into 50 groups of 100 storage positions (each word comprising 10 storage positions). Between adjacent groups of word areas is a blank area containing no signals to allow a time interval for control.

The intermediate storage drum 9 is capable of storing a group of words in six circumferential tracks corresponding to six code elements and similarly has a blank area between the beginning and the end of the storage areas.

The intermediate storage drum rotates at a higher speed than the main storage drums, for example 50 times as fast. The intermediate storage drum and a main storage drum (or an element synchronized therewith) have means thereon for generating a synchronizing signal once in each rotation, and there would therefore be 50 such signals from the intermediate storage for each such signal from a main storage. The main and intermediate storages are coupled together mechanically as already explained. This allows selection of a storage area to be based on relative timing of the intermediate and main storage drums.

The synchronizing signal from the main storage indicates the beginning of a time period for the selection and this period is subdivided by the 50 synchronizing signals delivered successively in the 50 successive rotations of the intermediate storage during the one rotation of the main storage. The selecting of any of the 100 storage positions within a selected group of words in done by counting the storage positions, and one selecting means is operative under control of a predetermined count.

The selection of groups may be made in a similar way.

In the transfer of signals from a main storage drum to the intermediate storage drum and vice versa, where selection is made on a basis of counting, a start signal will be included in the transfer indicating the beginning of the count, so that the selection may be independent of actual location on the storage.

In one of the examples illustrated and described below (FIG. 4*c*), signals are entered into the storage from a 6-channel magnetic tape in which a given number of columns is sensed for each rotation of the intermediate storage. The sensing cycle may be started in dependence on the zero position of the intermediate storage, and may be terminated automatically at the end of the rotation of the intermediate storage, for example, after the traverse of an area of 100 columns, or may be terminated by a stop signal sensed from the tape. The signals thus transferred to the intermediate storage drum are then retransferred to any selected area in the main storage, from which they may be taken whenever required and via the intermediate storage delivered to, for example, a printer or computer for column-wise or word-wise operation, according to a program.

In all these cases, selection may be made by the operation of keys in a keyboard or their equivalent, or from punched or magnetic tapes or other storages controlling electromechanical or electronic relays, preferably selection means including counting tubes or counting chain systems.

*Electrical Means for Selection*

Figure 4A:
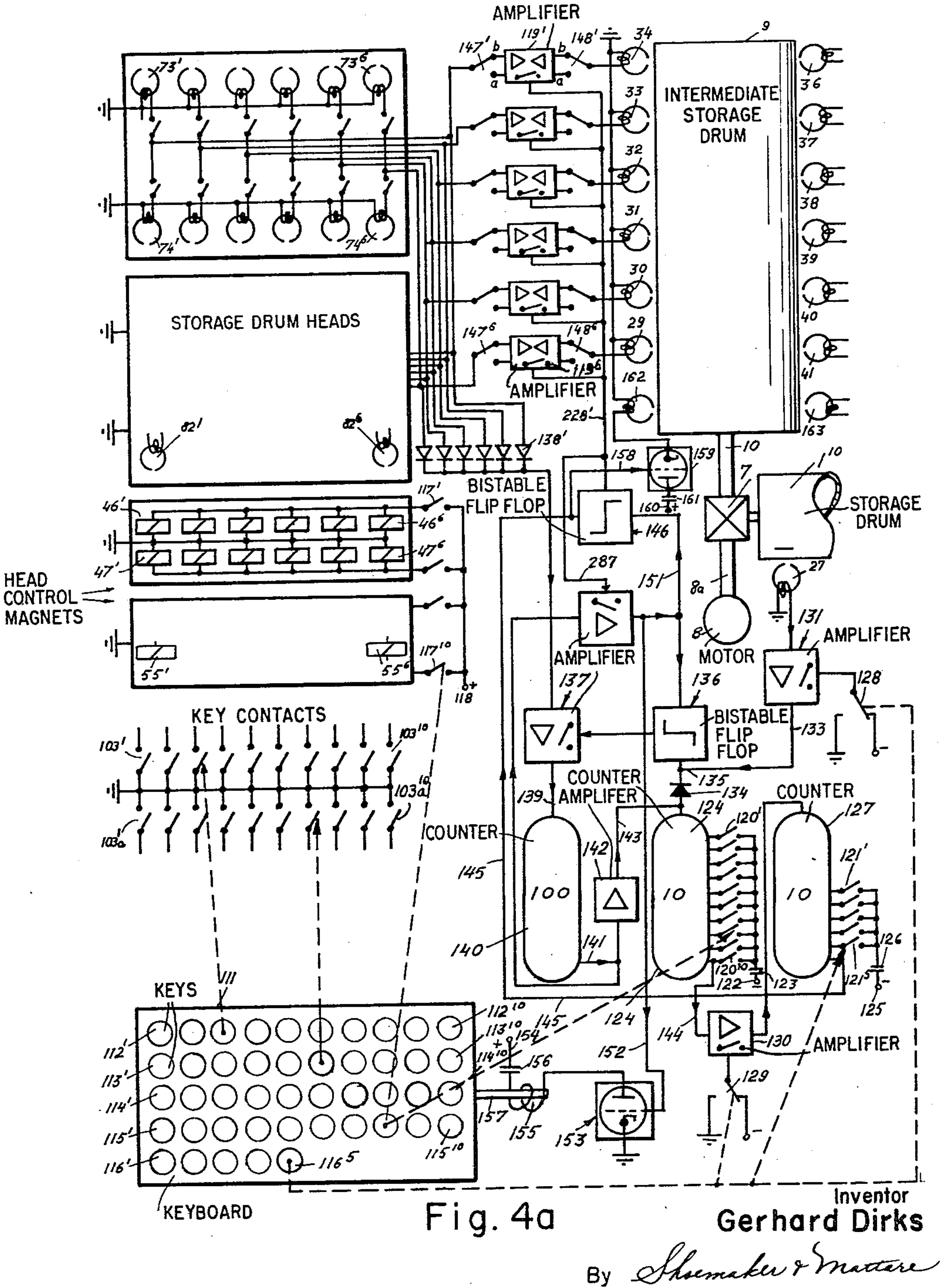

FIG. 4*a* shows the circuit diagram for the control of sensing or recording. FIG. 4*a* shows schematically the keyboard 111 by which the selection of any desired storage area may be controlled. Depending upon which of the keys $112^{1-10}$ and $113^{1-10}$ is pressed, signal heads $73^1$ to $82^6$ will be shifted and one of the tracks of one of the storage drums $1^{1-10}$ will be selected.

The selection of the track which is to be sensed, is effected by depressing one of the keys $112^{1-10}$ and one of keys $113^{1-10}$ whereby by the selected key 112 one of the switches $103^{1-10}$ will be closed and movement of the selecting rod 110 will be started in the manner already described above. By the depression of the selected key 113 one of the contacts $103a^{1-10}$ of the second driving unit (corresponding to $103^{1-10}$ in the first driving unit) will be closed whereby the second driving unit also effects a movement for shifting the signal heads.

The selection of one of the storage drums $1^{1-10}$ is effected by depressing one of the keys $114^{1-10}$ whereby one of the contacts $117^{1-10}$ will be closed and a circuit from plus pole 118 is completed through whichever one of the contacts $117^{1-10}$ is closed and through the corresponding group of coils $46^{1-6}$ to $55^{1-6}$ and from there to ground.

By the excitation of one of these groups of coils $46^{1-6}$ to $55^{1-6}$, one of the groups of signal heads $73^{1-6}$ to $82^{1-6}$ is brought into sensing position in a way described above with reference to FIGS. 2*a* and *b*, so that the drum, in which one of the signal head groups $73^{1-6}$ to $82^{1-6}$ is in sensing position may be used for the control of amplifier $119^{1-6}$.

The position of the storage area within a selected track on the surface of these drums may be determined by pressing one of the keys $115^{1-10}$ and one of the keys $116^{1-5}$.

The selection of the storage areas for recording or sensing on the circumference of one of the tracks of one of the storage drums will be made effective by the circuits described later, by the depressing of one of the keys $115^{1-10}$, closing one of the contacts $120^{1-10}$, and the depression of one of the keys $116^{1-5}$, closing one of the contacts $121^{1-5}$. By closing one of the contacts $120^{1-10}$ a negative pulse is delivered from the negative pole 122 through capacitor 123 and the then closed contact to one of the cathodes of the counting tube arrangement 124 whereby said counting tube arrangement is set to the digit value corresponding to the complementary value of the depressed one of the keys $115^{1-10}$. This is shown in more detail in FIG. 5*g*.

By closing one of the contacts $121^{1-5}$ a negative pulse from the negative pole 125 is delivered through capacitor 126 and the then closed contact to the counting tube system 127, whereby this counting tube system will be set to the complementary value of the digit value represented by that key of the keys $116^{1-5}$ which has been depressed. At the same time, the depressing of one of the keys $116^{1-5}$ effects the changing over of both contacts 128 and 129, so that both amplifiers 130 and 131 become effective. Since amplifier 131 is operative, the one permanent synchronization pulse provided for storage drum $1^{10}$ and indicating the beginning of the storage tracks on the circumference of the storage drums $1^{1-10}$ is sensed by signal head 27, amplified by amplifier 131 and fed through lead 133 and diode 134 to the counting tube system 124 whereby the value registered by said counting tube system as a result of operation of contacts 120 is increased by one. At the same time, this pulse is delivered through lead 135 to bistable flip-flop 136 which is switched to the other stable state so that amplifier 137 is made operative. The signals sensed by that one of the groups of signal heads $73^{1-6}$ to $82^{1-6}$ which has been shifted into sensing position, as described above, are conducted through diodes $138^{1-6}$ to the input lead of the amplifier 137 and after amplification are fed via lead 139 to the counting tube system 140 whereby the value registered by said counting tube system is increased by one for each character which is sensed. For illustrating the principle of the electronic control of the selection of one area in a track, both the selection of a group of words and of a particular storage position will be described with reference to a selection from a main storage, although in the preferred embodiment described later with reference to FIGS. 4*b*–4*c* the selection of a particular storage position, the column is done from the intermediate storage. The pulses delivered to lead 141 each time a carry occurs in the counting tube arrangement 140 are delivered through amplifier 142 and lead 143 to the counting tube system 124 which has the registered value increased by one for each such pulse. When the counting tube arrangement 124 has reached its zero position, its output lead 144 receives a pulse which is conducted through the then operative amplifier 130 to the input of the counting tube arrangement 127 and increases the registered value by one. After the zero position has been reached in counting tube system 127, a pulse is delivered to the output lead 145, which switches over the bistable flip-flop 146 and renders operative the amplifiers $119^{1-6}$.

If the read/write switches $147^{1-6}$ and $148^{1-6}$ are in switching position *b* the signals from the operative signal head of signal head groups $73^{1-6}$ to $82^{1-6}$ are fed through the switches $147^{1-6}$ to the input leads of the amplifiers $119^{1-6}$. The sensed signals are amplified by these amplifiers $119^{1-6}$ and are recorded in the intermediate storage drum 9 by the signal heads 29 to 34, which are connected through the switches $148^{1-6}$ in switch position *b* to the output lead of the amplifiers $119^{1-6}$. At the same time that amplifiers $119^{1-6}$ are made operative, amplifier 150 is made operative by flip-flop 146. Thereby the pulse at output lead 141 of counting tube system 140, which occurs after the sensing and recording of ten signals subsequent to the rendering operative of amplifiers $119^{1-6}$, is fed through amplifier 150 and lead 151 to the other input of flip-flop 136, whereby said flip-flop is switched back to the original state and amplifier 137 is rendered inoperative. At the same time, this pulse is fed to the other input of flip-flop 146 thereby making the amplifiers $119^{1-6}$, as well as amplifier 150, inoperative since the flip-flop is returned to the original state. This pulse is also fed through lead 152 to the control grid of gas discharge stage 153. Thereby the gas discharge tube will be ignited, so that there is a circuit from plus pole 154 through capacitor 156, magnet coil 155 and gas discharge tube 153 to ground. The current flowing in this circuit is determined by the charging time constant of the capacitor 156. By the energization of the magnet coil 155 armature 157 is actuated momentarily so that the keys of the keyboard 111 will be released and the circuits which had been closed by the depressing of the respective keys of the keyboard 111 are broken in order to avoid a repetition of the above described process for the selection.

Output lead 145 of the counting tube system 127, a pulse in which switches over flip-flop 146 and starts the sensing and recording process, is also connected through lead 158 to the gas discharge stage 159. The discharge stage 159 is thereby ignited and there is for a short time a current flow from plus pole 160 through capacitor 161, gas discharge stage 159 and signal head 162. Thus a signal will be recorded by the head 162 on the intermediate storage drum 9, at the beginning of the signal transfer operation.

FIG. 4*a* also shows the signal heads 36, 37, 38, 39, 40 and 41 which may be used for the sensing of one selected group of words from the intermediate storage drum 9 for recording in one of the drums $1^{1-10}$. The signal head 163 may be used for the sensing of the synchronization signal, which had been recorded by signal head 162 at the beginning of a signal transfer to the intermediate storage drum 9. A transfer from the intermediate storage 9 to one selected track of one of the drums $1^{1-10}$ may be effected in such a way that these signals are sensed by the heads 29 to 34 and the resulting pulses are fed through the switches $148^{1-6}$, which are in switching position *a*, to the amplifiers $119^{1-6}$. They are fed after amplification through the switches $147^{1-6}$, which are likewise in switching position *a*, to one selected signal head of the groups $73^{1-6}$ to $82^{1-6}$ in dependence on which of the magnets $48^{1-6}$–$55^{1-6}$ had been energized. A record is thereby effected on that one of the storage drums $1^{1-10}$ for which at such time the signal head has been selected.

If the six signal heads are mounted for simultaneous movement, only one pair of electromagnets 46, 47 is necessary for each pair of drums.

Figure 4B:
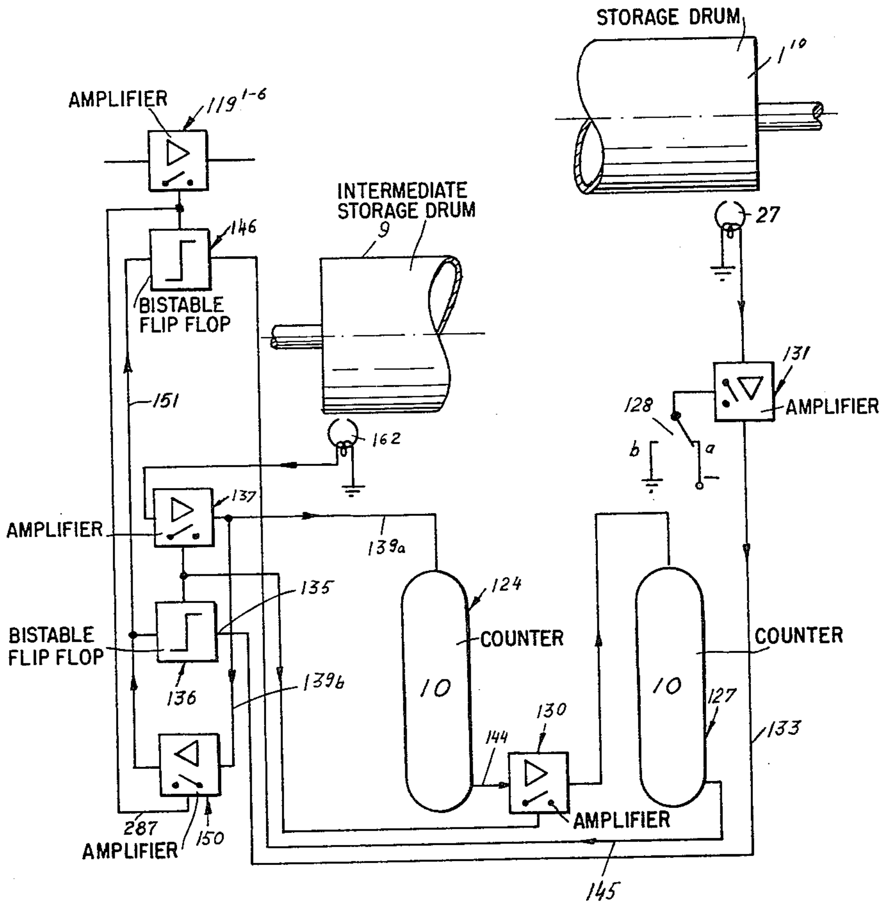

FIG. 4*b* is a partial circuit diagram showing an arrangement for controlling signal transfer by means of signals derived from the intermediate storage drum 9.

By changing switch 128 from switching position *a* into switching position *b* amplifier 131 is made operative. The permanent signal indicating the zero position of storage drum $1^{10}$ is therefore sensed by signal head 27, and amplified by amplifier 131 and fed through lead 133 to the input lead 135 of flip-flop 136. By switching the flip-flop 136 into its opposite stable state, amplifier 137 is made conductive. Thereby the signal indicating the zero position of the intermediate storage drum 9 and sensed by signal head 162, is amplified by amplifier 137 and fed through lead 139*a* to the counting tube system 124. The counting tube system 124 therefore has the value registration increased by one for each rotation of the intermediate storage drum 9. The counting tube system 124 is set to a predetermined digit value as described with reference to FIG. 4*a*. In the same way, counting tube system 127 will be set to a predetermined digit value.

The pulses produced at output lead 144 each time the counting tube system 124 passes through "0," are amplified by amplifier 130, which had been made operative together with amplifier 137 by flip-flop 136. These pulses are fed to the input lead of counting tube system 127. When the counting tube system 127 has been counted through to its "0" position, a pulse is produced on output lead 145 which switches over flip-flop 146 into the other stable state. Thereby amplifiers $\mathbf{119}^{1-6}$ and amplifier 150 are made operative. This allows amplifiers $\mathbf{119}^{1-6}$ to effect sensing or recording of signals on one of the storage drums $\mathbf{1}^{1-10}$ in the manner described above with reference to FIG. 4*a*. The recording or sensing process lasts until the intermediate storage drum 9 has completed one rotation. At the end of this rotation the permanent signal indicating the zero position of the intermediate storage drum 9 is again sensed by signal head 162 and amplified by amplifier 137. This amplified signal is fed to the amplifier 150 through lead 139*b*. After passing the amplifier 150 this signal is fed to the left hand input lead of flip-flops 136 and 146. These flip-flops are thereby switched over and amplifier 137 is made inoperative by flip-flop 136. Flip-flop 146 is this position makes the amplifiers $\mathbf{119}^{1-6}$ and amplifier 150 inoperative. Making amplifiers $\mathbf{119}^{1-6}$ inoperative prevents a further sensing or recording of signals, and making the amplifier 137 inoperative ensures that the zero position signal of the intermediate storage drum 9 is not sensed repeatedly.

Figure 4C:
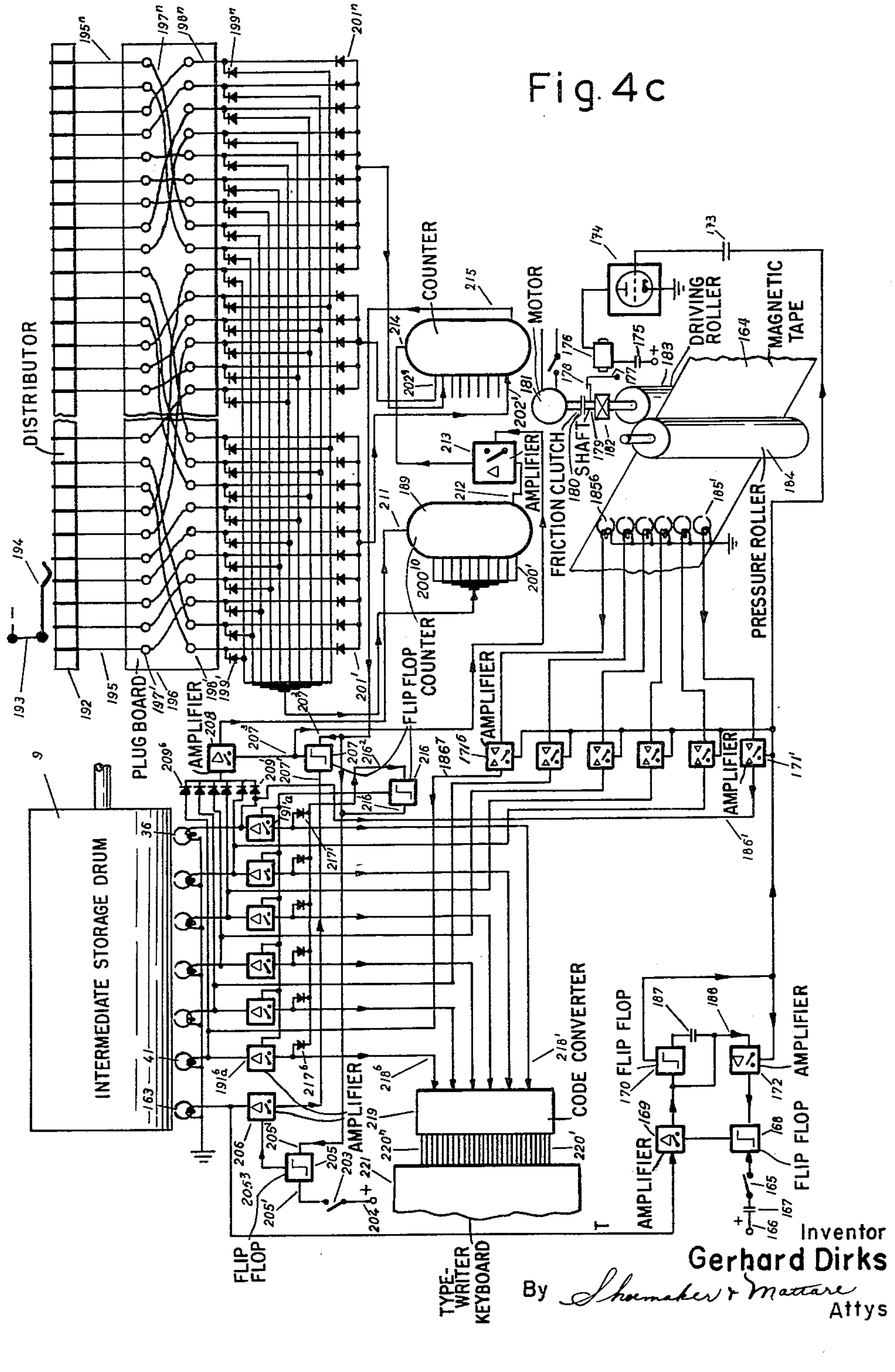

FIG. 4*c* shows the recording of signals on the intermediate storage drum 9 from an input means in the form of a 6-channel magnetic tape 164, and the program-controlled selective sensing of signals from the intermediate storage drum 9 for the actuation of an output means, e.g. a typewriter. The recording of signals from magnetic tape 164 is effected in the following way. The closing of start switch 165 delivers a positive pulse from plus pole 166 through capacitor 167 to flip-flop 168.

The switching-over of flip-flop 168 makes amplifier 169 operative. Thereby the permanent zero position signal of the intermediate storage drum 9 sensed by signal head 163 produces a pulse which is transferred through the amplifier 169 to the flip-flop 170 switching said flip-flop into the other stable state.

The switching-over of flip-flop 170 makes the amplifiers $\mathbf{171}^{1-6}$ and amplifier 172 operative. At the same time, a positive pulse is delivered through capacitor 173 to the grid of the gas discharge tube 174. This pulse ignites the gas discharge tube in the gas discharge means 174 so that capacitor 175 charges through the magnet coil 176.

The charging current of the capacitor 175 effects a short energization of the magnet coil 176 which actuates the armature 177. The actuation of armature 177 releases the locking lever 178 to allow one rotation of shaft 179. The shaft 179 is driven through the friction clutch 180 by motor 181. Shaft 179 drives the driving roller or roll 183 through gear 182. The roll 183 drives the magnetic tape 164 in conjunction with the pressure roller on roll 184. One rotation of shaft 179 actuates gear 182 to feed magnetic tape 164 through driving roll 183 by a distance which corresponds to that occupied by the storage area of 100 coded signals combinations; that is, 100 columns on the magnetic tape 164. If varying extents of traverse of the tape are required, the one rotation clutch will be replaced by a magnetic clutch operating in dependence on control signals. The permanent zero position signal of the intermediate storage drum 9 would be used as a start signal, e.g. to ignite a discharge tube circuit through the winding of the clutch, and a stop signal from the tape at the end of the recorded information would interrupt such discharge circuit and stop the movement of the driving roller 183.

In the case illustrated, the positive pulse delivered through capacitor 173 causes a sensing of 100 columns of recorded code signal combinations of the tape. These signals are sensed by the signal heads $\mathbf{185}^{1-6}$ and fed to the then operative amplifiers $\mathbf{171}^{1-6}$. The output leads $\mathbf{186}^{1-6}$ of these amplifiers are connected to the signal heads 36 to 41, which are adapted to record the sensed signals on the intermediate storage drum 9 accordingly. The end of the sensing cycle is controlled by the second sensing of the permanent pulse mentioned above. This pulse, sensed by signal head 163 is fed through amplifier 169 and capacitor 187 to both inputs of flip-flop 170. Thereby flip-flop 170 is switched back to its initial state and the amplifiers $\mathbf{171}^{1-6}$ are made inoperative.

The pulse amplified by amplifier 169 is at the same time passed via lead 188 to the amplifier 172 and thus to flip-flop 168. The switching-over of the flip-flop 168 makes amplifier 169 inoperative and prevents a repetition of the sensing process. Immediately after the passage of the pulse delivered from lead 188 through amplifier 172, said amplifier is likewise made inoperative by the reversal of state of the flip-flop 170.

The sensing of signals from the intermediate storage drum 9 is effected in such a way that a predetermined code signal is selected from the word groups recorded on the intermediate storage drum 9 by the setting of the two counting tube systems 189 and 190 which control the sensing amplifiers $\mathbf{191}a^{1-6}$.

The selection process is achieved in the following way. A negative pulse is delivered through the distributor 192 from minus pole 193 and the movable contact 194 to one of the leads $\mathbf{195}^{1-n}$. The selection of the respective lead $\mathbf{195}^{1-n}$ is effected in dependence on the position of the carriage of an output means in the form of a typewriter in the embodiment shown. Contact 194 is mounted to move with the carriage of the typewriter. This negative pulse is delivered from the output leads $\mathbf{195}^{1-n}$ to the plug board 196. This plug board allows the connection of the leads $\mathbf{195}^{1-n}$ through flexible plug wire $\mathbf{197}^{1-n}$ to any required output lead $\mathbf{198}^{1-n}$. From the output leads $\mathbf{198}^{1-n}$ the negative pulse is fed through one of the diodes $\mathbf{199}^{1-n}$ to one of the input leads $\mathbf{200}^{1-10}$ of the counting tube system 189. At the same time, this pulse is fed through one of the diodes $\mathbf{201}^{1-n}$ to one of the input leads $\mathbf{202}^{1-9}$ of the counting tube system 190. The diodes $\mathbf{199}^{1-n}$ are connected in such a way that all the diodes which have in the last denomination of the index value the same digit value are connected to the same input lead 200, for instance diodes $\mathbf{199}^{2}$, $\mathbf{199}^{19}$, $\mathbf{199}^{29}$ etc. are connected to the lead $\mathbf{200}^{9}$. The diodes $\mathbf{201}^{1-n}$ are connected in parallel in decades, i.e. the diodes $\mathbf{201}^{1-10}$ are connected to the input lead $\mathbf{202}^{1}$ of the counting tube system 190, whereas the diodes $\mathbf{201}^{11-20}$ are connected to the input lead $\mathbf{202}^{2}$ of the counting tube system 190, etc. By the pulses fed to the leads $\mathbf{200}^{1-10}$ and $\mathbf{202}^{1-9}$ of the counting tube systems 189 and 190, these counting tube systems are set to determined digit values, which are determined by the position of the distributor contact 194 and the arrangement of the connection leads $\mathbf{197}^{1-n}$ in the plug board 196.

The selection of the signal combination which is to be sensed on the intermediate storage drum 9, is determined by the pre-setting of both counting tube systems 189 and 190. The selection is initiated by a positive pulse which is delivered from plus pole 204 to the input lead $\mathbf{205}^{1}$ of flip-flop 205 by the closing of start switch 203. Thereby the flip-flop 205 is switched into its other stable state and amplifier 206 is made operative through lead $205^3$. The permanent zero position signal for the intermediate storage drum 9 is sensed by signal head 163 and is amplified by amplifier 206 and is applied through lead $207^1$ to flip-flop 207. This flip-flop is switched to its other stable state and through lead $207^3$ makes amplifier 208 operative. Thereby the combination signals sensed by the signal heads 36—41 are fed through the diodes $209^{1-6}$, amplifier 208 to input lead 211 of the counting tube system 189.

The value registration of counting tube system 189 is advanced step by step by the aforementioned pulses. On passing through the "0" position, the counting tube system 189 generates a positive pulse on output lead 212 which is amplified by amplifier 213, which was likewise made operative by flip-flop 207, and fed through lead 214 to the counting tube system 190. This counting tube system is advanced step by step by these pulses. When the counting tube system 190 has reached its "0" position, a positive pulse is produced on to output lead 215 which is applied to flip-flop 207 through lead $207^2$ and switches back this flip-flop into its initial state which makes amplifier 208 again inoperative. At the same time, this pulse is fed through lead $205^2$ to the flip-flop 205 switching it into its initial state which makes amplifier 206 again inoperative.

The rendering inoperative of amplifier 206 prevents a repetition of the aforedescribed process. The pulse applied to output lead 215 is at the same time fed through lead $216^1$ to flip-flop 216. The flip-flop 216 is thereby switched into its other stable state to make amplifiers $191^{1-6}$ operative. The making operative of amplifiers $191a^{1-6}$ effects an amplification of the combination signals sensed in the respective sub-tracks by the signal heads 36—41. These signals are fed through the diodes $217^{1-6}$ to the input lead $216^2$ of flip-flop 216 and switch this flip-flop back into its initial stable state. The amplifiers $191a^{1-6}$ are thereby again made inoperative. This ensures that in each rotation only one sensed combination signal can be passed by the amplifiers $191a^{1-6}$. The sensed signals are fed through the leads $218^{1-6}$ to the converting system 219. This converting system is constructed in known way, e.g. by a set of relays to decode a code combination for the selecting of the respective operating electromagnets of a typewriter keyboard. Corresponding to the selected combination one of the output leads $220^{1-n}$ changes in potential. These leads $220^{1-n}$ are connected to the electromagnets operating the keys of the typewriter keyboard 221 and accordingly control actuation of the appropriate keys.

Figures 5A, 5B:
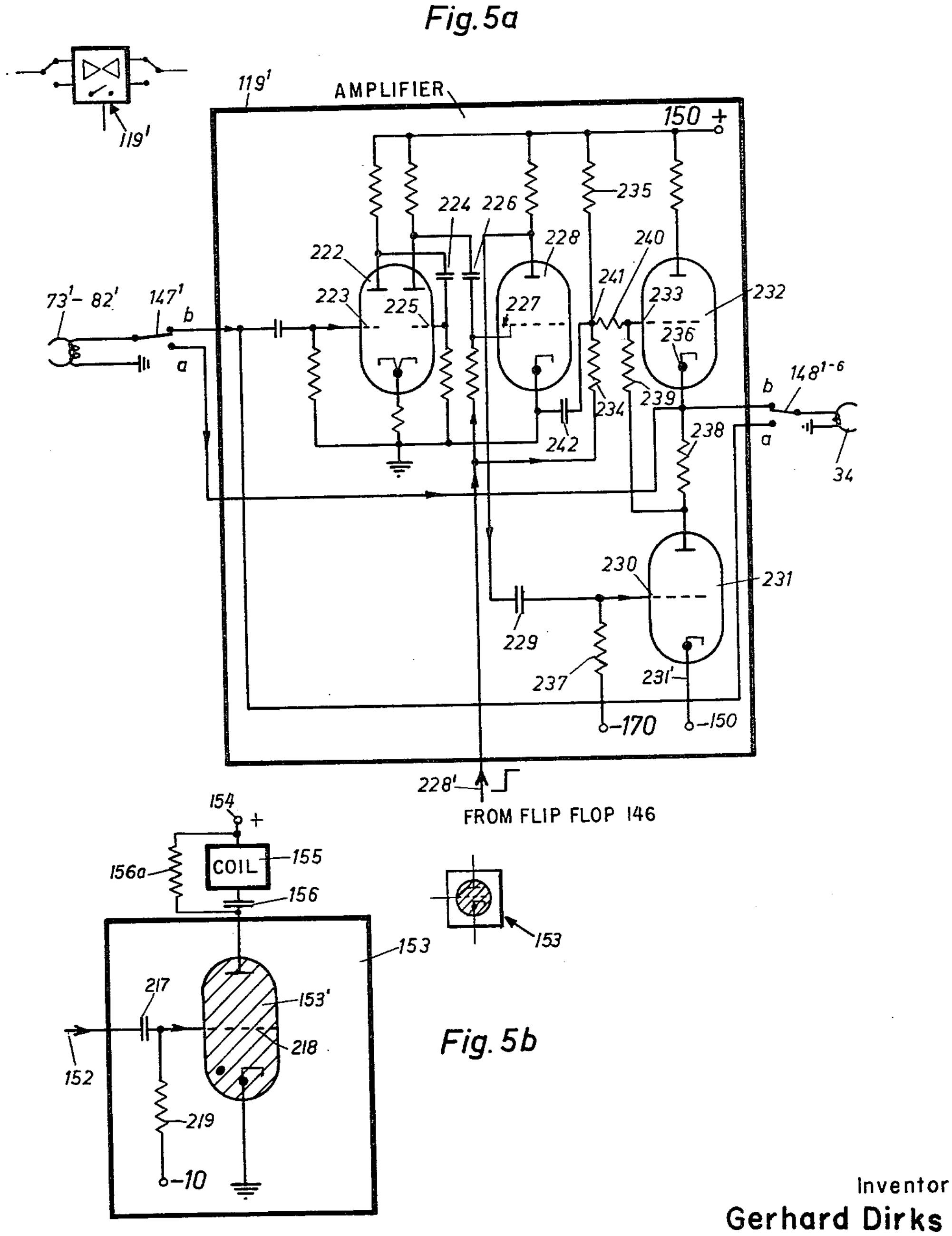

FIG. 5*a* shows the detailed circuit of one of the sensing and recording amplifiers $119^{1-6}$. The amplifier $119^1$ includes a double triode 222. The left hand grid 223 of the double triode 222 receives signals from the selected one of the signals heads $73^1$ to $82^1$ through switching position *b* of the switch $147^1$. These signals are amplified in the left hand system of the double triode 222 and are fed through capacitor 224 to the right hand grid 225 of double triode 222. After the signals have been amplified in the right hand system of the double triode 222, they are fed as negative pulses through capacitor 226 to the grid 227 of the triode 228. The triode 228 is controlled by the flip-flop 146 shown in FIG. 4*a* and in more detail in FIG. 5*e*. Flip-flop 146 provides a voltage on control lead $228^1$ according to the stable state of the flip-flop in such a way that either the voltage on this lead $228^1$ is so negative that triode 228 is cut off and the pulses fed to the grid 227 via capacitor 226 are ineffective or the control lead $228^1$ is at such a voltage that the triode 228 is conducting and the applied pulses bring the grid 227 back to cut off thus producing corresponding positive output pulses in the anode circuit.

The triode 232 is also controlled together with tube 228 by an alteration of the potential of lead $228^1$. The potential at grid 233 of the triode 232 is determined by the two resistors 234 and 235 connected between the lead $228^1$ and the 150 volt positive supply. The resistors 234 and 235 are of such values that the plate current of the tube 232 is cut off when control lead $228^1$ has the more negative voltage. If the voltage of lead $228^1$ is at the less negative value the grid potential of grid 233 is increased and reaches approximately ground potential so that a substantial current flows through the signal head 34 which is connected in switching position *b* of the switch $148^1$ to the cathode 236 of the triode 232. This current effects the erasing of signals which have been previously recorded on the magnetic layer of the intermediate storage drum 9 as such layer passes below the signal head 34. The grid 230 of tube 231 is negatively biassed through its grid resistor 237 so that when no signals arrive the tube 231 draws practically no plate current. Thus, in the absence of a signal the current through the head 34 is only determined by the current through the tube 232. If, on the other hand, positive pulses are fed from the anode of triode 228 through capacitor 229 to the grid 230 of the triode 231, the grid bias of tube 231 is brought above cut off so that a plate current flows through resistor 238. This plate current produces a voltage drop across resistor 238 which is applied to the grid 233 of triode 232 through the resistor 239. As the voltage at lead point 241 is held relatively stable by the capacitor 242, namely at ground potential if triode 232 is conductive, the voltage drop across resistor 238 divides correspondingly to the ratio between the resistors 239 and 240 and the potential of the grid 233 of triode 232 alters accordingly. As the voltage of the anode of the triode 231 is negative relative to the cathode 236, also grid 233 becomes negative against the cathode, whereby the plate current through triode 232 is cut off. In consequence, there is a reversal of the direction of the current through the signal head 34 in respone to the application of positive pulses to the grid 230 of tube 231 and a corresponding recording of pulses by the signal head. The reversal of the direction of this current is caused by the fact that the voltage drop across resistor 238 is so great, that the plate current through tube 232 will be cut off and plate current flows from ground through the signal head 34, through tube 231 to the potential of —150 volts at lead $231^1$.

As the control of tube 231 is effected by short pulses, the magnetization of the magnetic layer of drum 9 is effected for a short instant in the reverse direction compared with the direction while erasing. This effects recording of a signal.

If, on the other hand, signals are to be transferred from the intermediate storage drum 9 to one of the storage drums $1^{1-10}$, the switches $147^1$, $148^1$ are switched over into their switching position *a*. The signal head 34 is now connected to the grid 223 of the amplifier $119^1$, whereas the signal heads $73^1$ to $82^1$ are used as recording heads and are connected to cathode 236 of tube 232.

FIG. 5*b* shows the gas discharge stage 153. This includes the gas discharge tube $153^1$ to the grid 218 of which positive pulses are applied from input lead 152 through capacitor 217. This grid 218 has a negative pre-bias of 10 volts through resistor 219, which normally prevents ignition of gas discharge tube $153^1$. The signals on lead 152 produce ignition of discharge tube $153^1$. Thereby a circuit passing a large current is provided from plus pole 154 through coil 155 and capacitor 156 through the ionized discharge tube $153^1$ to its cathode and to ground.

The current flows until capacitor 156 is charged sufficiently for the voltage across the tube $153^1$ to fall below the conduction maintaining voltage, whereupon the tube is extinguished.

The gas discharge stage 159 is similar to the discharge stage 153 illustrated. The only difference between both circuit diagrams is that instead of the magnet coil 155 in the plate circuit of the gas discharge $153^1$ according to FIG. 5*b*, the signal head 162 may be switched into the cathode lead of the gas discharge tube if a recorded start signal instead of a permanent zero signal is to be used.

Figure 5D:
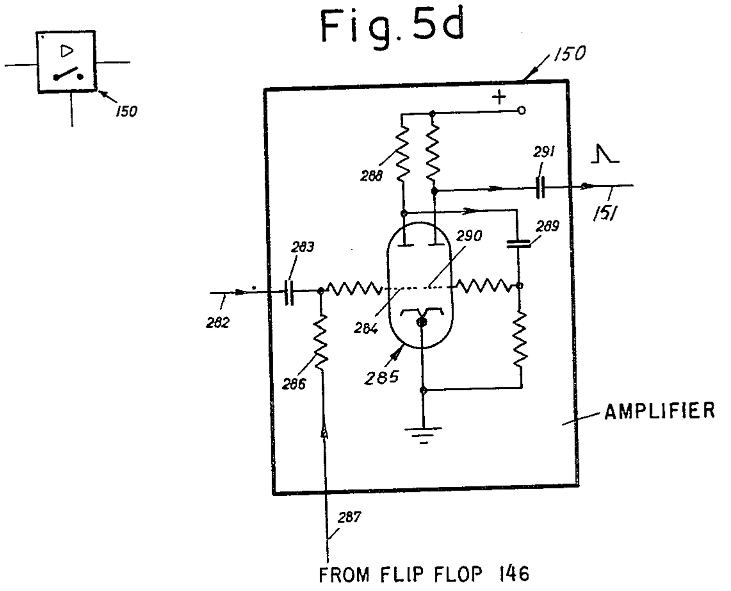
Figure 5C:
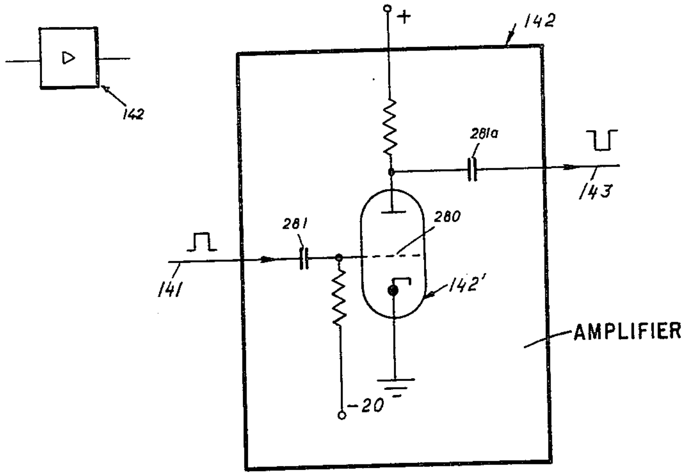

FIG. 5c shows in more detail the one stage amplifier 142, including the triode 142'. The grid 280 receives positive pulses from input lead 141 through coupling capacitor 281 which are amplified by triode $142^1$. These pulses are at the same time reversed in polarity. They are supplied through capacitor 281a to the output lead 143.

FIG. 5d shows in more detail the controlled amplifier 150 shown in block form in FIGS. 4a and b. The controllable amplifiers 131 and 137 are of the same structure. The controllable amplifier 130 is different from this one only in so far as the second stage is not used.

Pulses entering at lead 282 are fed through capacitor 283, to the left hand grid 284, of the double triode 285. The signals entering at lead 282 and conducted through capacitor 283 to grid 284 are amplified or not in dependence on the potential of the control lead 287. This potential is provided by flip-flop 146 (see FIGS. 4a and b and 5e) in accordance with the stable state of that flip-flop. Lead 287 may have such a negative potential that the positive signals entering at lead 282 do not bring the grid 284 above cut off and therefore cause conduction in the left hand half of the triode 285.

The grid bias may, on the other hand, also be less negative, so that the pulses entering at lead 282 may bring the grid above cut off and thereby produce negative pulses across anode resistor 288, which are fed to the right hand grid 290 through coupling capacitor 289. These pulses are amplified within the right hand system of the double triode 285 and are delivered through capacitor 291 to the output lead 151.

Figure 5F:
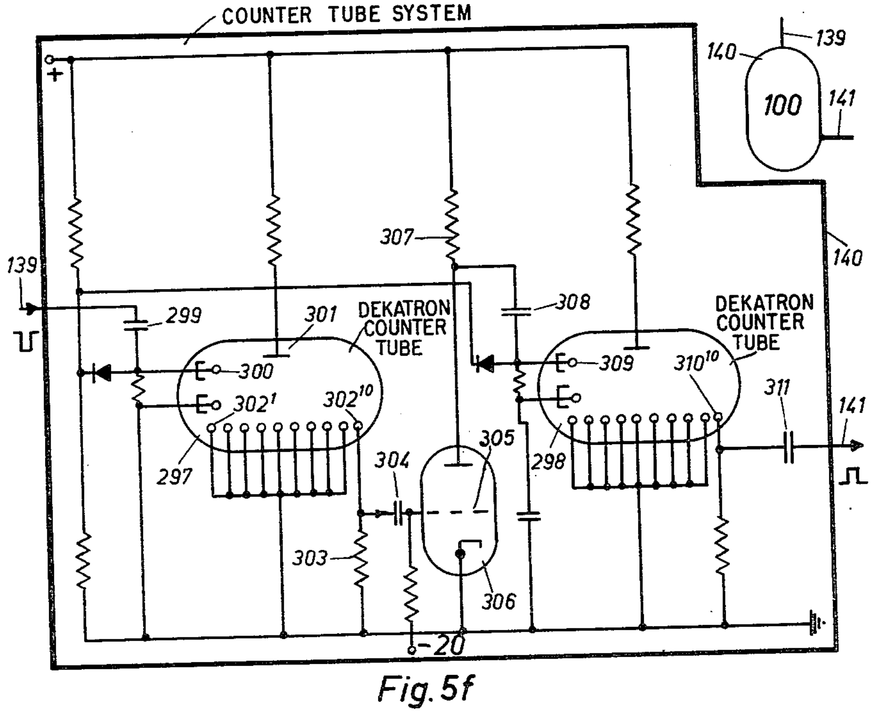
Figure 5E:
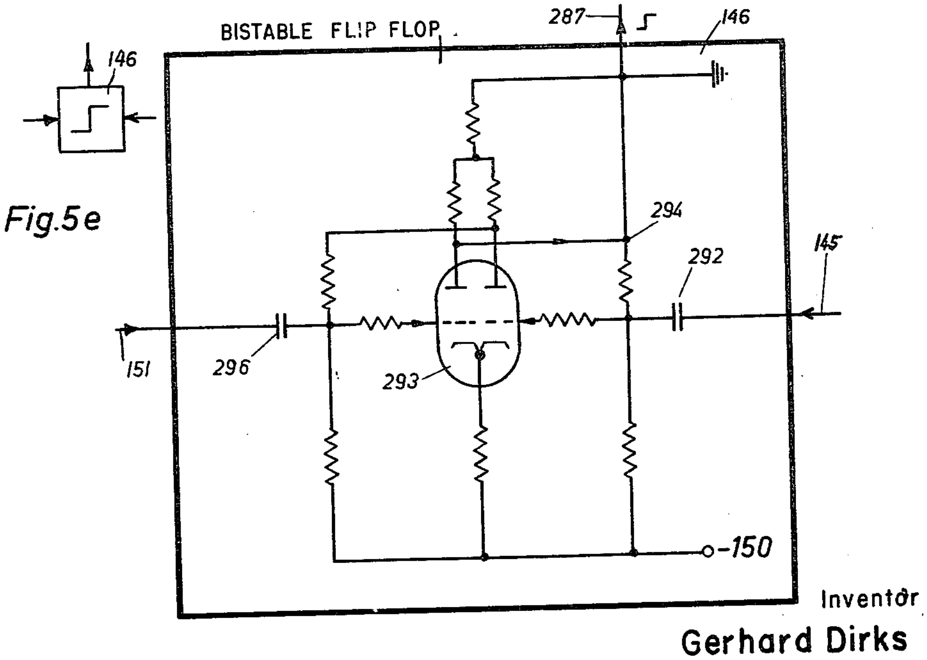

FIG. 5e shows in more detail the flip-flop 146 indicated in FIGS. 4a–b as a block diagram. The flip-flop 146 is used inter alia for the control of the controlled amplifier 150 of FIG. 5d. The basic circuitry of this flip-flop will be assumed as known. The control of the amplifier is effected in dependence on pulses entering at lead 145. The switching over of the flip-flop is dependent on positive pulses entering at lead 145, which are conducted through capacitor 292 to the grid of the right hand system of double triode 293.

Thereby the right hand system of the double triode 293 becomes conductive and the left hand system is made non-conductive, so that the voltage at lead point 294 is increased so that the potential of control lead 287 becomes less negative compared with ground potential. This causes the controlled amplifier 150 to be made operative, as explained. A positive pulse is applied to the input lead 151 to make the amplifier 150 inoperative. This positive pulse is fed through capacitor 296 to the grid of the left hand system of the double triode 293. By the increasing of the grid voltage of the left hand system of double triode 293 said left hand system becomes conductive so that the potential at lead point 294 and at lead 287 becomes more negative relative to ground potential so that controlled amplifier 150 of FIG. 5d will become inoperative.

FIG. 5f shows the counting tube system 140 in more detail. The counting tube system 140 has a counting capacity of 100 pulses. Counting tube 297 delivers after each ten pulses a pulse to counting tube 298. On the other hand, counting tube 298 delivers after ten such input pulses an output pulse to lead 141, i.e. 100 pulses must enter lead 139 before lead 141 receives an output pulse. Negative pulses are fed from lead 139 through capacitor 299 to the auxiliary cathode system 300 of the cold cathode dekatron tube. Thereby the glow discharge between anode 301 and one of the cathodes $302^{1-10}$ of counting tube 297 is shifted to the next cathode. If this glow discharge reaches the cathode $302^{10}$ a current flows through resistor 303 and produces a voltage drop across this resistor. This voltage drop applies a positive pulse through capacitor 304 to grid 305 of triode 306. This pulse is amplified by triode 306 and generates a negative pulse across the anode resistor 307. This negative pulse is fed through capacitor 308 to the auxiliary cathode system 309 of counting tube 298. The process described for tube 297 repeats in the tube 298 in the described way until the glow discharge reaches the cathode $310^{10}$ and delivers in consequence through capacitor 311 a positive pulse to output lead 141.

Figure 5G:
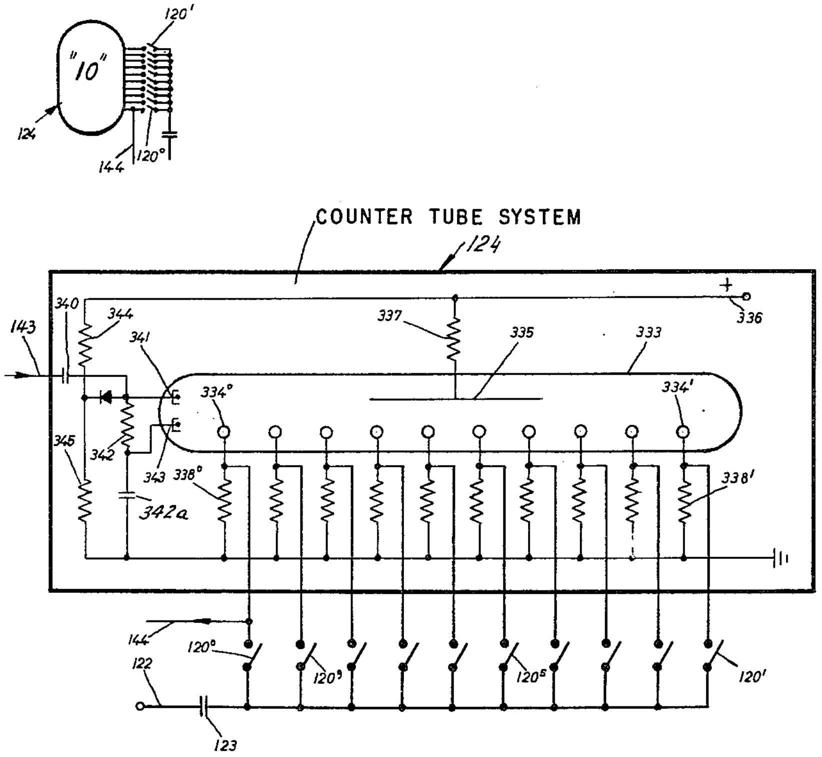

In FIG. 5g the switching circuitry of the controllable counting tube system 124 of FIG. 4a is shown in more detail. The counting tube system 124 includes the counting tube 333 with the ten counting cathodes $334^{1-0}$. Furthermore, counting tube 333 contains the anode 335. A positive voltage is delivered from plus pole 336 to the anode 335 through anode resistor 337. This positive voltage is such that a glow discharge arises between one of the counting cathodes $334^{1-0}$, which are connected to ground through the cathode resistors $338^{1-0}$, and anode 335. The glow discharge may be advanced from one counting cathode to the next counting cathode. This is effected in dependence on negative pulses, which are fed from input lead 143 through capacitor 340 to the auxiliary electrode system 341. These negative pulses are also fed with a little delay due to the integrating capacitor 342a through resistor 342 to the auxiliary electrode system 343.

The two auxiliary electrode systems 341 and 343 are interposed with single electrodes between the counting cathodes, but system 343 is commonly connected to the auxiliary electrode system 341. The electrodes of the auxiliary electrode system 343 are pre-biassed with a positive voltage through the voltage divider, which is formed by the two resistors 344 and 345. Each of the negative pulses fed through capacitor 340 effects an advance of the glow discharge from one of the counting cathodes $334^{1-0}$ to the next. A pre-setting of the counting tube system is effected by a negative pulse from negative pole 122 through capacitor 123 and the one closed switch of switches $120^{1-0}$ to one of the counting cathodes $334^{1-0}$. This negative pulse causes the glow discharge to jump from the counting cathode on which it is, to the counting cathode which has received this negative pulse. The subsequent pulses on input lead 143 advance adjustment of the counting tube glow discharge from one counting cathode to the next. The glow discharge generates a positive voltage drop across that one of the resistors $338^{1-0}$ which is connected to the counting cathode carrying the discharge. When the glow discharge reaches counting cathode $334^0$, the positive voltage at the cathode appears in output lead 144.

The controllable counting tube system 127 differs from the controllable counting tube system 124 only by the absence of leads and switches corresponding to switches $120^{6-10}$.

Figure 6:
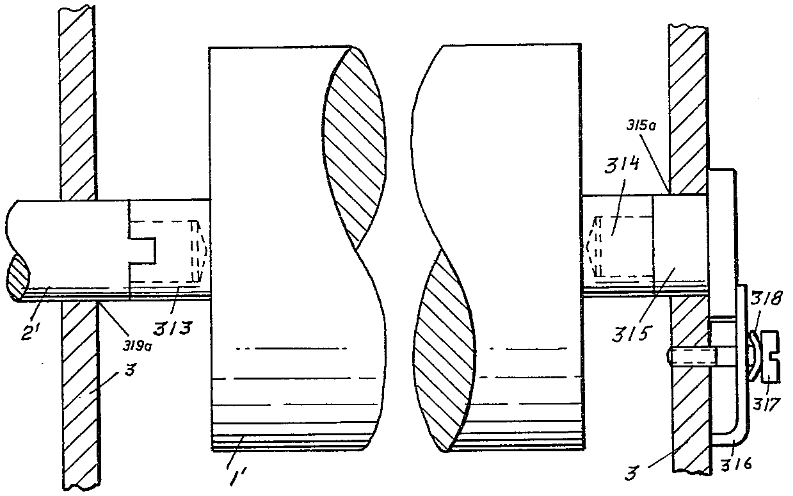
FIG. 6 shows an embodiment of the bearings of the drum of the large capacity storage with decoupling means to facilitate removal of a drum.

In order to allow use of the storage drums for input the arrangement of FIG. 6 may be used. Storage drum $1^1$, for example, is mounted on shaft 313 having a boring 314 into which the stud 315 enters. This stud 315 is held by the clamp 316 and screw 317 and spring washer 318. The opposite side of the drum is bored out and slotted to the shaft $2^1$ rotatably mounted in bearing 319a of the frame 3. The release of the clamp 316 allows the removal of stud 315 through the hole 315a to allow decoupling of the magnetic storage drum $1^1$ from the shaft $2^1$. It is evident that a drum may easily be removed from the frames in this manner and replaced by another.

Figure 7:
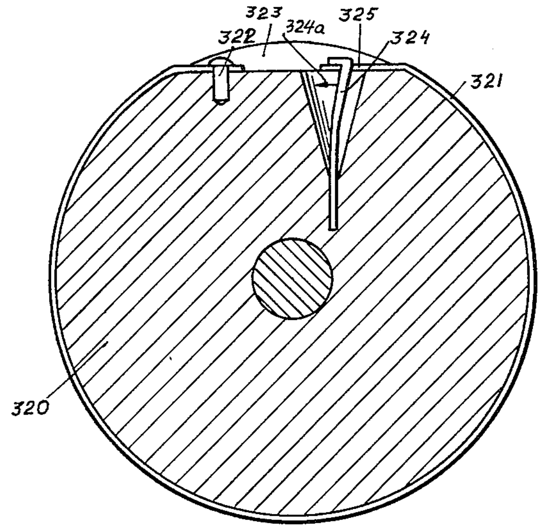
FIG. 7 shows an embodiment of the holding and registering means for interchangeable or replaceable magnetizable sheets laid around a drum.

FIG. 7 shows another method of replacing or exchanging the storage content of a storage drum. The magnetizable surface of the drum 320 is provided on a removable magnetizable layer for instance in form of the layer on which a magnetizable material is dispersed on thin magnetizable sheets themselves. This removable layer 321 is held by the registering studs 322 within a groove 323 of drum 320. The spring 324 exerts a tension in direction 324a, its free end passes through holes in the edge 325 of the magnetizable layer sheet, etc. By this tension the surface of the sheet is closely held against the surface of the drum 320, providing a sufficiently precise surface to allow operation as described above for drums having an integral storage layer. The sheets 321 may have the edges strengthened by for example metallic bars.

The signals for sensing and recording are shown in more detail in FIGS 8*a* to 8*c*. FIG. 8*a* shows the signals in the form of pulses in parallel tracks, in which the different code elements are contained within these different tracks, according to a binary combination. The first character symbolized by such pulses will be the number 50 in binary form shown at "A" followed by number 23 in binary form shown at "B" and followed next by number 42 in binary form shown at "C."

FIG. 8*b* shows a serial form of record of such signals in which track A may represent the number 50, track B the number 23 and track C the number 42, or one track may contain all these numbers serially. These serial records may be of a combination type similar to those shown with reference to FIG. 8*a*, but they may also be of a digit-wise pulse type as shown in FIG. 8*b*, in which, within track A the number 50 is shown by five pulses within the first sector and no pulse within the second sector or, to represent number 23 in track B two pulses indicating digit value 2 are recorded within the first sector and three pulses are recorded in the second sector and so on.

FIG. 8*c*, on the other hand, shows the respective forms for recording in which instead of pulses a length of signals representing a certain modulation frequency is recorded being coordinated as to the length of the recording to the respective digit value, so that a number of wave lengths corresponds to one pulse of FIG. 8*b* in order to make this method of recording very independent of noise or the like, if only the integral of a plurality of wave lengths indicates a pulse.

FIG. 9 shows another form of the large capacity storage in which around the shaft 326 held in a bearing 327 are arranged rotatable magnetizable cylinders 328, 329 which have magnetizable surfaces within the interior of the drum as well as on the exterior. Movable signal heads $\mathbf{330}^1$ and $\mathbf{330}^2$ are shown for the inner cylinder as well as signal heads $\mathbf{331}^1$ and $\mathbf{331}^2$ for the outside cylinder. The signal heads may be moved by shifting the frame 332 to and fro in arrow directions 333. The frame 332 is positioned by an arrangement similar to that used for the rod 110 (FIG. 1).

The shaft may be arranged vertically in order to simplify the arrangement. The signal head holders may be tubes coaxially arranged within the cylindrical drums. Such tubes may also be used as counter bearings for the whole arrangement.

There may be more than one intermediate storage, for example, two drums, and these may be arranged for alternate operation for recording and sensing.

There may also be more than one arrangement of shiftable signal heads so that the one may be adjusted for the next selection while the other is operative in a preceding sensing or recording. The intermediate storage could have a plurality of shiftable or selectively-switchable groups of signal heads so that an intermediate storage may deal with information in more than one group of tracks.

The intermediate storage may be used for computing purposes, for example the drum may also comprise part of the arithmetic unit of a computer.

What I claim is:

1. Data signal storage apparatus, comprising, in combination, a frame; a pair of main magnetic storage drums mounted in said frame with their axes parallel; a common driving shaft coupled to both said drums to rotate them in synchronism; individual magnetic signal transducing assemblies for said two drums, respectively; a common carrier carrying said two transducing assemblies; means normally operative to retain each of said transducing assemblies in an ineffective position in which it is spaced apart from the surface of the related one of said drums; control means respectively connected with said transducing assemblies, each control means being operable to move the associated transducing assembly in a direction substantially perpendicular to the surface of the related one of said drums and towards such surface to bring the particular transducing assembly to an effective transducing position; and signal amplifying means connected in common to both said transducing assemblies.

2. Apparatus as claimed in claim 1, having a pair of parallel shafts mounted in said frame, and gears coupling each of said parallel shafts to said common driving shaft, each of said main storage drums being secured to one of said parallel shafts.

3. Apparatus as claimed in claim 1, in which said main storage drums comprise hollow cylinders of respectively different diameters secured to said common shaft, one within the other, and in which said transducing assemblies are so mounted that one such assembly cooperates with the outer cylindrical surface of the drum of smaller diameter, and the other such assembly cooperates with the inner cylindrical surface of the drum of larger diameter.

4. Apparatus as claimed in claim 2 in which said common carrier comprises a rod mounted parallel to said parallel shafts and slidably in said frame, said apparatus including means operative to rotate said transducing assemblies about the axis of said rod to bring said assemblies to said effective position; driving means operative to move said rod longitudinally relative to said frame in a step-by-step manner; means settable to represent a desired position of said transducing assemblies relative to said drums, and means responsive to the setting of said settable means to control operation of said driving means.

5. Data signal storage apparatus comprising, in combination, a frame; a plurality of parallel shafts supported in said frame; main magnetic storage drums secured on said shafts respectively; a common driving shaft; gearing interconnecting said parallel shafts and said common driving shaft to rotate said parallel shafts in synchronism; individual magnetic signal transducing assemblies respectively associated with said storage drums; common driving means for all of said transducing assemblies and operative to shift said assemblies simultaneously in a direction parallel to the axes of said drums to any one of a number of selected positions relative to the particular associated drum; means tending to hold each of said transducing assemblies in an ineffective position adjacent to, but spaced from, the surface of the associated storage drum; individual control means for each transducing assembly operative to move such assembly, in a plane perpendicular to the axis of the associated drum, towards the surface of that associated drum to bring it to an effective transducing position; means for operating a selected one of said control means; and signal amplifying means connected in common to all of said transducing assemblies.

6. Apparatus as claimed in claim 5, having an armature coupled to a pair of said transducing assemblies, a first electromagnet operative, when energized, to move said armature in one direction to bring one of said transducing assemblies coupled therewith to its effective position and a second electromagnet operative, when energized, to move said armature in the opposite direction to bring the other transducing assembly of said pair to its effective position.

7. Apparatus as claimed in claim 5, having an auxiliary shaft, an intermediate magnetic storage drum secured to said auxiliary shaft, gearing coupling said auxiliary shaft to said common driving shaft to rotate said intermediate storage drum at a multiple of the speed of said main storage drums, a magnetic signal transducing assembly associated with said intermediate storage drum, and connections between said transducing assembly associated with said intermediate storage drum and said signal amplifying means to permit transfer of signals between said intermediate storage drum and said selected one of said main storage drums.

8. Apparatus as claimed in claim 7, in which each main storage drum has a plurality of signal storage tracks, each track being divided into a plurality of word storage areas, means settable to represent a selected one of said word storage areas of a track, means for generating reference signals in response to the rotation of said intermediate storage drum and means controlled jointly by said settable means and said reference signals to render operative said signal amplifying means to effect transfer of signals between said intermediate storage drum and said selected word position.

9. Selective signal storage apparatus including at least a pair of rotary storage drums each having a storage surface positioned adjacent each other in side by side relationship, comprising, in combination, at least a pair of sensing and recording means; carrier means supporting a pair of said sensing and recording means in position between adjacent storage surfaces of a pair of said storage drums; and carrier supporting means pivotally mounting said carrier means in a manner whereby in operative position one of said sensing and recording means is positioned in operative proximity with the storage surface of one of said storage drums and the other of the said sensing and recording means is simultaneously positioned out of operative proximity with the storage surface of the adjacent storage drum.

10. Selective signal storage apparatus including at least a pair of rotary storage drums each having a storage surface positioned adjacent each other in side by side relationship, comprising, in combination, at least a pair of sensing and recording means; carrier means supporting a pair of said sensing and recording means in position between adjacent storage surfaces of a pair of said storage drums; and carrier supporting means pivotally mounting said carrier means in a manner whereby in neutral position both of said sensing and recording means are simultaneously positioned out of operative proximity with the storage surfaces of adjacent storage drums and whereby in operative position one of said sensing and recording means is positioned in operative proximity with the storage surface of one of said storage drums and the other of the said sensing and recording means is simultaneously positioned out of operative proximity with the storage surface of the adjacent storage drum.

11. Selective signal storage apparatus including at least a pair of rotary storage drums each having a storage surface positioned adjacent each other in side by side relationship, comprising, in combination, at least a pair of sensing and recording means; carrier means supporting a pair of said sensing and recording means in position between adjacent storage surfaces of a pair of said storage drums; and carrier supporting means pivotally mounting said carrier means in a manner whereby in neutral position both of said sensing and recording means are simultaneously positioned out of operative proximity with the storage surfaces of adjacent storage drums and whereby in operative position the said carrier means is tiltable to either side of said neutral position in a plane substantially perpendicular to the axes of said storage drums to position one of said sensing and recording means in operative proximity with the storage surface of one of said storage drums.

12. Selective signal storage apparatus including at least a pair of rotary storage drums each having a storage surface positioned adjacent each other in side by side relationship with the axes thereof parallel to each other, comprising, in combination, at least a pair of sensing and recording means; carrier means supporting a pair of said sensing and recording means in position between adjacent storage surfaces of a pair of said storage drums; and carrier supporting means for simultaneously shifting said sensing and recording means with respect to the storage surfaces of said storage drums and parallel to the axes of the said storage drums and for pivotally mounting said carrier means in a manner whereby in neutral position both of said sensing and recording means are simultaneously positioned out of operative proximity with the storage surfaces of adjacent storage drums and whereby in operative proximity the said carrier means is tiltable to either side of said neutral position in a plane substantially perpendicular to the axes of said storage drums so that one of said sensing and recording means is positioned in operative proximity with the storage surface of one of said storage drums and the other of the said sensing and recording means is simultaneously positioned out of operative proximity with the storage surface of the adjacent storage drum.

13. Selective signal storage apparatus including at least a pair of rotary storage drums each having a storage surface positioned adjacent each other in side by side relationship, comprising, in combination, at least a pair of sensing and recording means; carrier means supporting a pair of said sensing and recording means in position between adjacent storage surfaces of a pair of said storage drums; carrier supporting means pivotally mounting said carrier means in a manner whereby in operative position one of said sensing and recording means is positioned in operative proximity with the storage surface of one of said storage drums and the other of said sensing and recording means is simultaneously positioned out of operative proximity with the storage surface of the adjacent storage drum; and means for positioning both of said sensing and recording means in neutral position wherein both of the said sensing and recording means are simultaneously positioned out of operative proximity with the storage surfaces of adjacent storage drums.

14. Selective signal storage apparatus including at least a pair of rotary storage drums each having a storage surface positioned adjacent each other in side by side relationship, comprising, in combination, at least a pair of sensing and recording means; carrier means supporting a pair of said sensing and recording means in position between adjacent storage surfaces of a pair of said storage drums; carrier supporting means pivotally mounting said carrier means in a manner whereby in neutral position both of said sensing and recording means are simultaneously positioned out of operative proximity with the storage surfaces of adjacent storage drums and whereby in operative position one of said sensing and recording means is positioned in operative proximity with the storage surface of one of said storage drums and the other of the said sensing and recording means is simultaneously positioned out of operative proximity with the storage surface of the adjacent storage drum; means for normally holding said sensing and recording heads in said neutral position; and means for moving said sensing and recording heads into said operative position in opposition to said holding means.

15. Selective signal storage apparatus including at least a pair of rotary storage drums each having a storage surface positioned adjacent each other in side by side relationship, comprising, in combination, at least a pair of sensing and recording means; carrier means supporting a pair of said sensing and recording means in position between adjacent storage surfaces of a pair of said storage drums; carrier supporting means pivotally mounting said carrier means in a manner whereby in neutral position both of said sensing and recording means are simultaneously positioned out of operative proximity with the storage surfaces of adjacent storage drums and whereby in operative position one of said sensing and recording means is positioned in operative proximity with the storage surface of one of said storage drums and the other of the said sensing and recording means is simultaneously positioned out of operative proximity with the storage surface of the adjacent storage drum; spring means for normally holding said sensing and recording heads in said neutral position; and magnetic means for moving said sensing and recording heads into said operative position in opposition to said spring means.

16. Selective signal storage apparatus including at least a pair of rotary storage drums each having a storage surface positioned adjacent each other in side by side relationship, comprising, in combination, at least a pair of sensing and recording means; carrier means supporting a pair of said sensing and recording means in position between adjacent storage surfaces of a pair of said storage drums; carrier supporting means pivotally mounting said carrier means in a manner whereby in neutral position both of said sensing and recording means are simultaneously positioned out of operative proximity with the storage surfaces of adjacent storage drums and whereby in operative position one of said sensing and recording means is positioned in operative proximity with the storage surface of one of said storage drums and the other of the said sensing and recording means is simultaneously positioned out of operative proximity with the storage surface of the adjacent storage drum; spring means for normally holding said sensing and recording heads in said neutral position; and a pair of electromagnets for moving said sensing and recording heads into said operative position in opposition to said spring means, each of said electromagnets being positioned to control the position of an associated one of said pair of sensing and recording heads.

17. Data signal storage apparatus comprising, in combination, a frame; a plurality of parallel shafts supported by said frame; a main magnetic storage drum mounted on each of the shafts respectively; a common driving shaft; gearing means interconnecting said common driving shaft with each of said parallel shafts to rotate the main storage drums in synchronism; an auxiliary shaft supported in said frame; an intermediate magnetic storage drum carried by said auxiliary shaft; gearing means interconnecting said common driving shaft and said auxiliary shaft to rotate said intermediate storage drum at a multiple of the speed of said main storage drums; magnetic signal transducing means individually connected for cooperation with said storage drums, respectively; signal transfer means connected to said signal transducing means of said intermediate storage drum and in common to said signal transducing means of all the main storage drums; selecting means operative to render effective the signal transducing means of a selected one of said main storage drums to effect the transfer of signals between said intermediate storage drum and said selected main storage drum; a plurality of magnetic signal head assemblies each associated with a corresponding one of said main storage drums; means supporting each of said magnetic signal head assemblies for movement parallel to the storage surface of the associated main storage drum; common driving means adapted to move said magnetic signal head assemblies; first electrical switching means settable to represent a position to which said magnetic signal head assemblies are to be moved; second electrical switching means settable to represent the actual position of said magnetic signal head assemblies; a driving shaft; a clutch coupling said driving shaft to said common driving means for said magnetic signal head assemblies; and control means for said clutch responsive to the setting of both said first and second electrical switching means.

18. Apparatus as claimed in claim 17, in which said first electrical switching means comprises a plurality of keys arranged as a keyboard and a plurality of electrical contacts selectively settable by said keys; and said second electrical switching means comprises a rotary contact switching device driven in synchronism with the movement of said head assemblies.

References Cited in the file of this patent

UNITED STATES PATENTS

| | | |
|---|---|---|
| 2,575,342 | Gridley | Nov. 20, 1951 |
| 2,611,813 | Sharpless | Sept. 23, 1952 |
| 2,690,913 | Rabinow | Oct. 5, 1954 |
| 2,708,267 | Weidenhammer | May 10, 1955 |
| 2,721,990 | McNaney | Oct. 25, 1955 |
| 2,733,425 | Williams et al. | Jan. 31, 1956 |
| 2,796,597 | Poorte et al. | June 18, 1957 |
| 2,831,180 | Hasbrouck | Apr. 15, 1958 |
| 2,832,841 | Eldridge | Apr. 29, 1958 |
| 2,852,761 | Hagopian | Sept. 16, 1958 |
| 2,925,238 | Lynott | Feb. 16, 1960 |
| 2,940,065 | Formby | June 7, 1960 |